US010462716B2

(12) United States Patent
Zhang

(10) Patent No.: US 10,462,716 B2
(45) Date of Patent: Oct. 29, 2019

(54) NETWORK ACCESS METHOD, RELEVANT DEVICE AND SYSTEM

(71) Applicant: CHINA ACADEMY OF TELECOMMUNICATIONS TECHNOLOGY, Beijing (CN)

(72) Inventor: Juan Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/084,532

(22) PCT Filed: Mar. 16, 2017

(86) PCT No.: PCT/CN2017/076959
§ 371 (c)(1),
(2) Date: Sep. 12, 2018

(87) PCT Pub. No.: WO2017/167027
PCT Pub. Date: Oct. 5, 2017

(65) Prior Publication Data
US 2019/0082364 A1 Mar. 14, 2019

(30) Foreign Application Priority Data
Apr. 1, 2016 (CN) .......................... 2016 1 0204057

(51) Int. Cl.
H04W 4/00 (2018.01)
H04W 36/00 (2009.01)
(Continued)

(52) U.S. Cl.
CPC ....... *H04W 36/0066* (2013.01); *H04W 36/18* (2013.01); *H04W 48/10* (2013.01);
(Continued)

(58) Field of Classification Search
CPC ...... H04W 36/18; H04W 52/40; H04W 36/14
See application file for complete search history.

(56) References Cited

U.S. PATENT DOCUMENTS 8,566,455 B1 10/2013 Zhao et al.
2009/0176496 A1* 7/2009 Li .......................... H04L 47/767
455/437

(Continued)

FOREIGN PATENT DOCUMENTS

CN 101247634 A 8/2008
CN 102056273 A 5/2011
(Continued)

OTHER PUBLICATIONS

International Search Report for PCT/CN2017/076959 dated Jun. 19, 2017 and its English translation provided by WIPO.
(Continued)

Primary Examiner — Omoniyi Obayanju
(74) Attorney, Agent, or Firm — Ladas & Parry, LLP

(57) ABSTRACT

A network access method, a relevant device and a system are provided. The network access method includes: storing, by a UE, identifier information of a network node that the UE accesses via a first RAN; and transmitting, by the UE, a connection establishment request comprising the identifier information of the network node to a second RAN while the UE maintains the connection to the first RAN, to enable the second RAN to select the network node for the UE as a network node that the UE accesses via the second RAN.

14 Claims, 14 Drawing Sheets

(51) Int. Cl.
| | |
|---|---|
| *H04W 48/18* | (2009.01) |
| *H04W 76/15* | (2018.01) |
| *H04W 76/11* | (2018.01) |
| *H04W 76/16* | (2018.01) |
| *H04W 76/27* | (2018.01) |
| *H04W 36/18* | (2009.01) |
| *H04W 48/10* | (2009.01) |
| *H04W 88/06* | (2009.01) |

(52) U.S. Cl.
CPC .......... *H04W 48/18* (2013.01); *H04W 76/11* (2018.02); *H04W 76/15* (2018.02); *H04W 76/16* (2018.02); *H04W 76/27* (2018.02); *H04W 88/06* (2013.01)

(56) References Cited

U.S. PATENT DOCUMENTS

| | | | |
|---|---|---|---|
| 2009/0300207 A1 | 12/2009 | Giaretta et al. | |
| 2010/0062800 A1 | 3/2010 | Gupta et al. | |
| 2010/0105386 A1 | 4/2010 | Guo | |
| 2010/0208698 A1* | 8/2010 | Lu | H04W 36/0027 370/331 |
| 2011/0019614 A1 | 1/2011 | O'Neill et al. | |
| 2014/0051393 A1 | 2/2014 | Mildh et al. | |
| 2014/0204927 A1 | 7/2014 | Horn et al. | |
| 2014/0211615 A1 | 7/2014 | Murphy et al. | |

FOREIGN PATENT DOCUMENTS

| | | |
|---|---|---|
| CN | 103002543 A | 3/2013 |
| CN | 103813358 A | 5/2014 |
| CN | 103873366 A | 6/2014 |
| EP | 2159972 A1 | 3/2010 |
| JP | 2010537523 A | 12/2010 |
| JP | 2011525319 A | 9/2011 |
| JP | 2012514955 A | 6/2012 |
| WO | 2014185832 A1 | 11/2014 |

OTHER PUBLICATIONS

Written Opinion of the International Search Authority PCT/CN2017/076959 dated Jun. 19, 2017 and its English translation provided by Google Translate.

NTT DOCOMO. 'P-CR on Solution 1:Redirection Solution', SA WG2 Meeting #103, S2-141710, May 23, 2014, pp. 1-7.

NTT DOCOMO. 'P-CR on Solution 1: Redirection after update location procedure', SA WG2 Meeting #104, S2-142879, Jul. 11, 2014, pp. 1-9.

Office Action from Taiwanese Application No. 106109864 dated Nov. 22, 2017 and a machine English translation.

Partial Supplementary Search Report from EP App. No. 17773057.9, dated Nov. 15, 2018.

First Office Action from CN App. No. 201610204057.2, dated Dec. 28, 2019, with English translation from Global Dossier.

Written Opinion of the International Searching Authority, from PCT/CN2017076959, dated Jun. 19, 2017, with English translation from WIPO.

International Preliminary Report on Patentability, from PCT/CN2017076959, dated Oct. 2, 2018, with English translation from WIPO.

Notice of Reasons for Refusal for JP app. No. 2018-551308, dated Jul. 30, 2019, with machine English translation from JPO.

* cited by examiner

NETWORK ACCESS METHOD, RELEVANT DEVICE AND SYSTEM

CROSS-REFERENCE TO RELATED APPLICATIONS

The present application is the U.S. national phase of PCT Application No. PCT/CN2017/076959 filed on Mar. 16, 2017, which claims priority to the Chinese patent application No. 201610204057.2 filed on Apr. 1, 2016, which are hereby incorporated by reference in their entireties.

TECHNICAL FIELD

The present disclosure relates to the field of communication technology, in particular to a network access method, a relevant device and a system.

BACKGROUND

Currently, a Radio Access Network (RAN) of a Long Term Evolution (LTE) network, rather than a RAN of a $2^{nd}$-Generation (2G)/$3^{rd}$-Generation (3G) network, is allowed to access to a core network of a mobile communication system, i.e., a User Equipment (UE) is merely allowed to reside in either the LTE network or the 2G/3G network at the same time. However, along with the development of the communication technology, in future it is probably necessary for the UE to reside in a network through two RANs. For example, it is necessary for a $5^{th}$-Generation (5G) network to support the UE to access the network through a plurality of access systems. Hence, there is an urgent need to provide a scheme for allowing the UE to reside in the network through two RANs simultaneously.

SUMMARY

An object of the present disclosure is to provide a network access method, a relevant device and a system, so as to allow the UE to reside in the network through two RANs simultaneously.

In one aspect, the present disclosure provides in some embodiments a network access method, including: storing, by a UE, identifier information of a network node that accesses a first RAN; and transmitting, by the UE, a connection establishment request to a second RAN while the UE maintains the connection to the first RAN, to enable the second RAN to select the network node for the UE as a network node that the UE accesses via the second RAN. The connection establishment request includes identifier information of the network node.

In a possible embodiment of the present disclosure, the network node includes a core network node, the core network node is configured to allocate a temporary identifier for the UE when the UE accesses the first RAN, and the temporary identifier includes identifier information of the core network node. The storing, by the UE, the identifier information of the network node that the UE accesses via the first RAN includes: receiving and storing, by the UE, the temporary identifier.

In a possible embodiment of the present disclosure, the network node includes a core network node and an aggregation node, the core network node is configured to allocate a temporary identifier for the UE when the UE accesses the first RAN, and the temporary identifier includes identifier information of the core network node. The storing, by the UE, the identifier information of the network node that the UE accesses via the first RAN includes: receiving and storing, by the UE, the temporary identifier and identifier information of the aggregation node, wherein the UE in the first RAN establishes a connection to the core network node through the aggregation node.

In a possible embodiment of the present disclosure, the identifier information of the aggregation node is transmitted by the aggregation node to the UE when the aggregation node has received the temporary identifier from the core network node, and the aggregation node is configured to manage and associate context information of the UE by using the temporary identifier.

In a possible embodiment of the present disclosure, the connection establishment request includes the identifier information of the aggregation node and the temporary identifier. The second RAN is configured to select the aggregation node as an aggregation node that the UE accesses via the second RAN, and the aggregation node is configured to manage and associate the context information of the UE by using the temporary identifier, and deliver a message transmitted by the UE in the second RAN through an interface between the aggregation node and the core network node established by the UE in the first RAN.

In a possible embodiment of the present disclosure, the temporary identifier is a first temporary identifier. The receiving and storing, by the UE, the temporary identifier and the identifier information of the aggregation node includes: receiving and storing, by the UE, the first temporary identifier and a second temporary identifier, wherein the second temporary identifier is allocated by the aggregation node for the UE and includes the identifier information of the aggregation node.

In a possible embodiment of the present disclosure, the connection establishment request includes the first temporary identifier and the second temporary identifier. The second RAN is configured to select the aggregation node as an aggregation node for the UE in the second RAN, and transmit the second temporary identifier to the aggregation node. The aggregation node is configured to manage and associate the context information of the UE by using the second temporary identifier.

In another aspect, the present disclosure provides in some embodiments a network access method, including: receiving, by a RAN node in a second RAN, a connection establishment request from a UE, the connection establishment request being transmitted by the UE while the UE maintains the connection to a first RAN, and the connection establishment request including identifier information of a network node that the UE accesses via the first RAN; and selecting, by the RAN node, the network node as a network node that the UE accesses via the second RAN by using the identifier information.

In a possible embodiment of the present disclosure, the network node includes a core network node, the core network node is configured to allocate a temporary identifier for the UE when the UE accesses the first RAN, the temporary identifier includes identifier information of the core network node, and the connection establishment request includes the temporary identifier.

In a possible embodiment of the present disclosure, the network node includes a core network node and an aggregation node, the core network node is configured to allocate a temporary identifier for the UE when the UE accesses the first RAN, and the temporary identifier includes identifier information of the core network node. The connection establishment request includes identification information of the aggregation node and the temporary identifier, and the UE in the first RAN establishes a connection to the core network node through the aggregation node.

In a possible embodiment of the present disclosure, the selecting, by the RAN node, the network node as the network node that the UE accesses via the second RAN by using the identifier information includes: selecting, by the RAN node, the aggregation node as an aggregation node that the UE accesses via the second RAN by using the identifier information of the aggregation node, to enable the aggregation node to manage and associate context information of the UE by using the temporary identifier, and deliver a message transmitted by the UE in the second RAN through an interface between the aggregation node and the core network node established by the UE in the first RAN.

In a possible embodiment of the present disclosure, the temporary identifier is a first temporary identifier, the connection establishment request includes the first temporary identifier and a second temporary identifier, and the second temporary identifier is allocated by the aggregation node for the UE and includes the identifier information of the aggregation node. The selecting, by the RAN node, the network node as the network node that the UE accesses via the second RAN by using the identifier information includes: selecting, by the RAN node, the network node as the network node that the UE accesses via the second RAN by using the second temporary identifier, to enable the aggregation node to manage and associate the context information of the UE by using the second temporary identifier.

In yet another aspect, the present disclosure provides in some embodiments a network access method, including: allocating, by a core network node, a temporary identifier for a UE when the UE accesses a first RAN, the temporary identifier including identifier information of the core network node; and transmitting, by the core network node, the temporary identifier to the UE, to enable that the UE stores the temporary identifier, wherein the UE transmits a connection establishment request including the temporary identifier to a second RAN while the UE maintains the connection to the first RAN, and the second RAN selects the core network node as a core network node that the UE accesses via the second RAN In a possible embodiment of the present disclosure, the transmitting, by the core network node, the temporary identifier to the UE includes: transmitting, by the core network node, the temporary identifier to an aggregation node, to enable the aggregation node to transmit the temporary identifier and identifier information of the aggregation node to the UE, wherein the UE in the first RAN establishes a connection to the core network node through the aggregation node.

In a possible embodiment of the present disclosure, the network access method further includes: receiving, by the core network node, a message delivered by the aggregation node through an interface between the aggregation node and the core network node established by the UE in the first RAN, wherein the message is transmitted by the UE in the second RAN.

In a possible embodiment of the present disclosure, the temporary identifier is a first temporary identifier, and the identifier information of the aggregation node is a second temporary identifier allocated by the aggregation node for the UE, and the second temporary identifier includes the identifier information of the aggregation node.

The above technical solutions of the present disclosure have at least the following beneficial effects. According to the embodiments of the present disclosure, the UE stores the identifier information of the network node that the UE accesses via the first RAN, and transmits the connection establishment request including the identifier information of the network node to the second RAN while the UE maintains the connection to the first RAN, so as to enable the second RAN to select the network node for the UE as a network node that the UE accesses via the second RAN. As a result, it is able for the UE to reside in the network through two RANs simultaneously.

DETAILED DESCRIPTION OF THE EMBODIMENTS

In order to make the objects, the technical solutions and the advantages of the present disclosure more apparent, the present disclosure will be described hereinafter in conjunction with the drawings and embodiments.

Figure 1A:
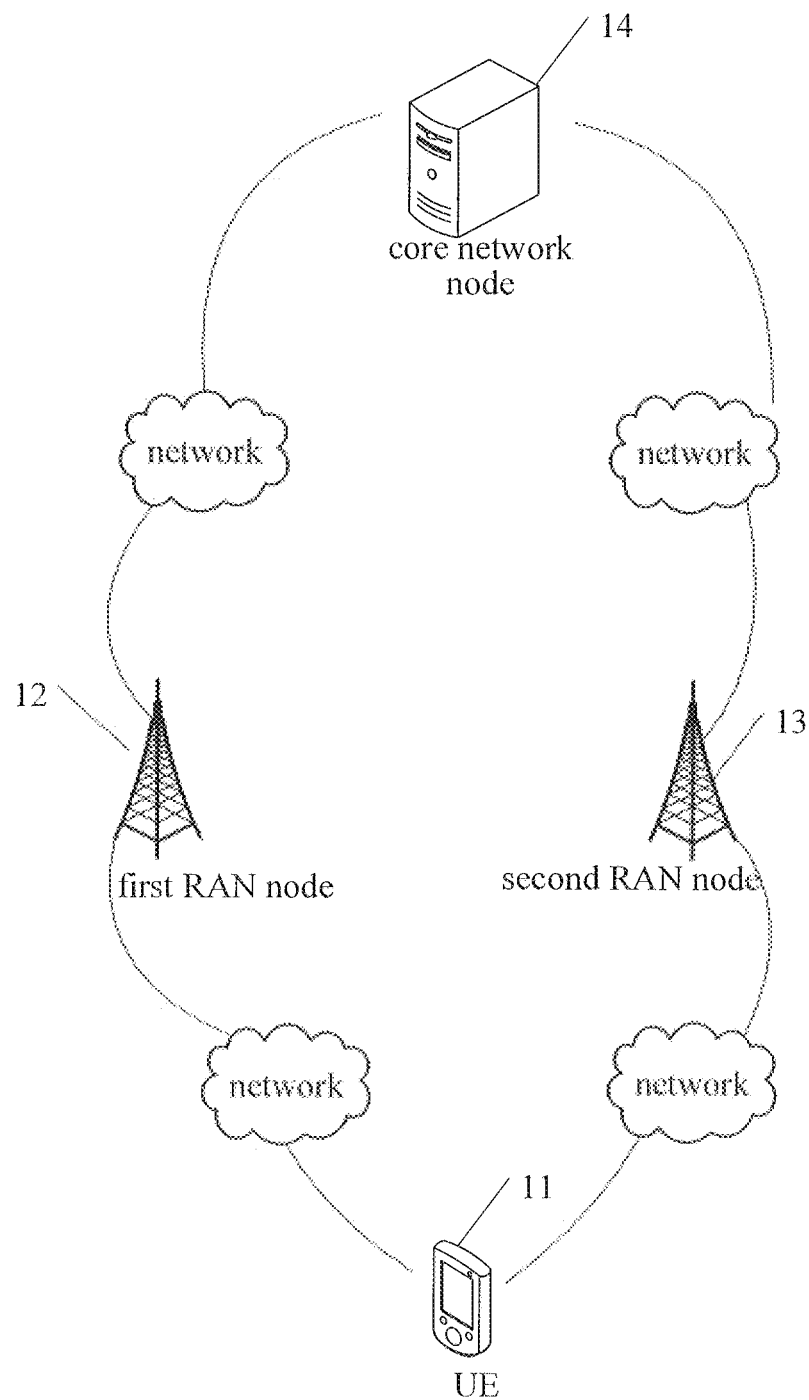
FIG. 1a is a schematic view showing a network according to one embodiment of the present disclosure.

Referring to FIG. 1a which shows a network according to one embodiment of the present disclosure, the network includes a UE 11, a first RAN node 12, a second RAN node 13, and a core network node 14. The UE 11 may be a terminal device such as a mobile phone, a tablet personal computer, a laptop computer, a personal digital assistant (PDA), a mobile Internet device (MID) or a wearable device, which will not be particularly defined herein. The first RAN node 12 may be a RAN node in a first RAN, e.g., a base station or a RAN device, and the first RAN may be a $5^{th}$-Generation (5G) RAN. In the embodiments of the present disclosure, a type of the first RAN node 12 will not be particularly defined. The second RAN node 13 may be a RAN node in a second RAN, e.g., a base station or a RAN device, and the second RAN may be an Evolved Universal Mobile Telecommunications System (UMTS) Terrestrial Radio Access Network (E-UTRAN). In the embodiments of the present disclosure, a type of the second RAN node 13 will not be particularly defined. The core network node 14 may be a node at a control plane of a core network, and a type of the core network node 14 will not be particularly defined herein.

Figure 1B:
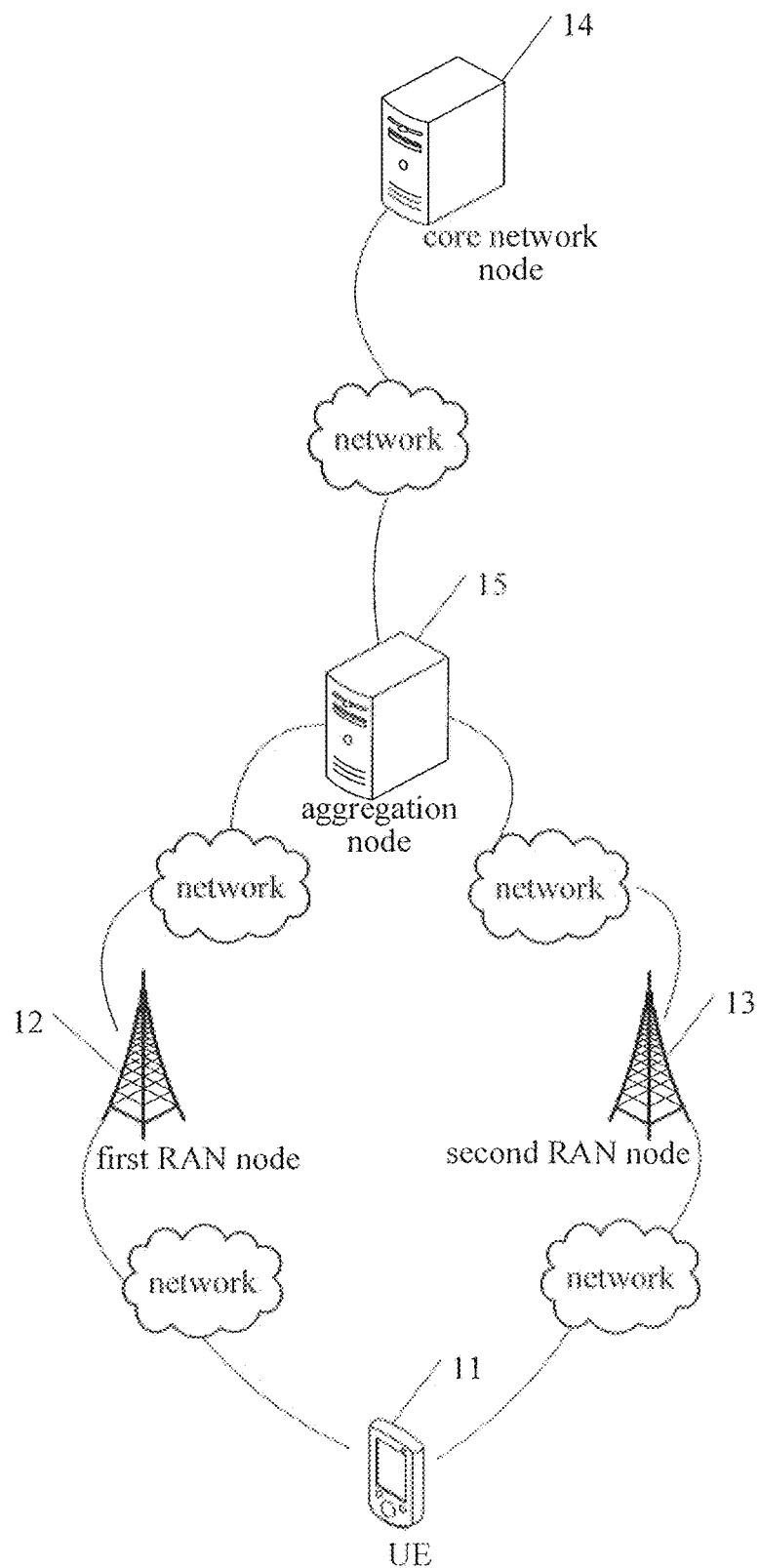
FIG. 1b is a schematic view showing another network according to one embodiment of the present disclosure.

In addition, in some scenarios, as shown in FIG. 1b, the network may further include an aggregation node 15 connected between the core network node 14 and the first RAN node 12, and connected between the core network node 14 and the second RAN node 13. The aggregation node 15 may be any device at a network side, and a type of the aggregation node 15 will not be particularly defined herein. In the embodiments of the present disclosure, there may be a plurality of core network nodes 14 and aggregation nodes 15. One core network node 14 and one aggregation node 15 are shown in FIG. 1b, but the number of the core network nodes 14 and the number of the aggregation nodes 15 will not be particularly defined herein.

Figure 2:
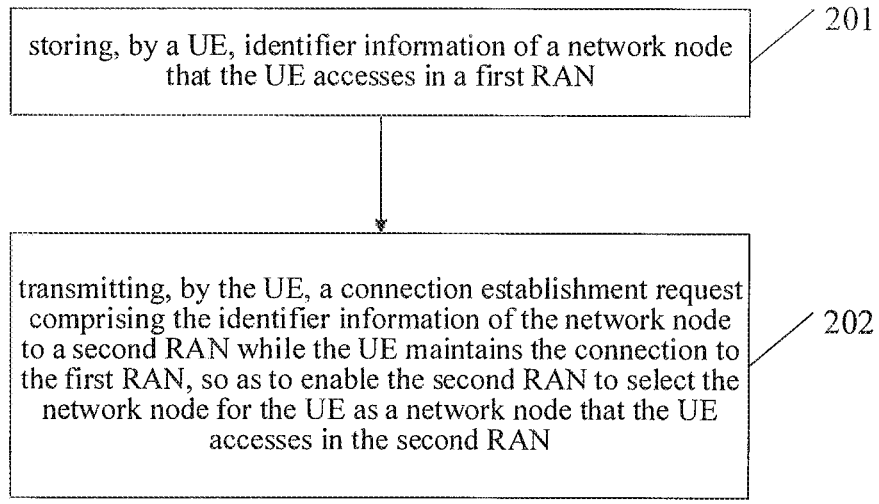
FIG. 2 is a flow chart of a network access method according to one embodiment of the present disclosure.

Based on the network in FIG. 1, the present disclosure provides in some embodiments a network access method which, as shown in FIG. 2, includes: Step 201 of storing, by a UE, identifier information of a network node that the UE accesses via a first RAN; and Step 202 of transmitting, by the UE, a connection establishment request to a second RAN while the UE maintains the connection to the first RAN, so as to enable the second RAN to select the network node for the UE as a network node that the UE accesses via the second RAN, wherein the connection establishment request includes identifier information of the network node.

In the embodiments of the present disclosure, the network node may be a network node that the UE accesses when the UE accesses the first RAN, the identifier information of the network node may be received and stored by the UE when the UE accesses the first RAN, and the network node may include a core network node, or both the core network node and an aggregation node. In addition, it should be appreciated that, the UE transmits the connection establishment request while the UE maintains the connection to the first RAN, which indicates that the UE may reside in the network through the first RAN and transmit the connection establishment request to the second RAN. In this way, it is able for the UE to reside in the network through the first RAN and the second RAN simultaneously. In addition, the connection establishment request may be a signaling connection request, e.g., a Radio Resource Control (RRC) connection establishment request for requesting to establish the RCC connection to the second RAN. It should be further appreciated that, all the connection establishment requests in the embodiments of the present disclosure may be signaling connection requests, but a type of the connection establishment request will not be particularly defined herein. Through the connection establishment request, it is able for the second RAN to select the network node as a network node that the UE accesses via the second RAN, thereby to enable the network node (e.g., the core network node) that the UE accesses via the second RAN to be the same as the network node (e.g., the core network node) that the UE in the first RAN. In addition, in the embodiments of the present disclosure, the second RAN may also be understood as a RAN node in the second RAN.

In a possible embodiment of the present disclosure, the network node may include a core network node, the core network node is configured to allocate a temporary identifier for the UE when the UE accesses the first RAN, and the temporary identifier includes identifier information of the core network node. Step 201 may include receiving and storing, by the UE, the temporary identifier.

Figure 3:
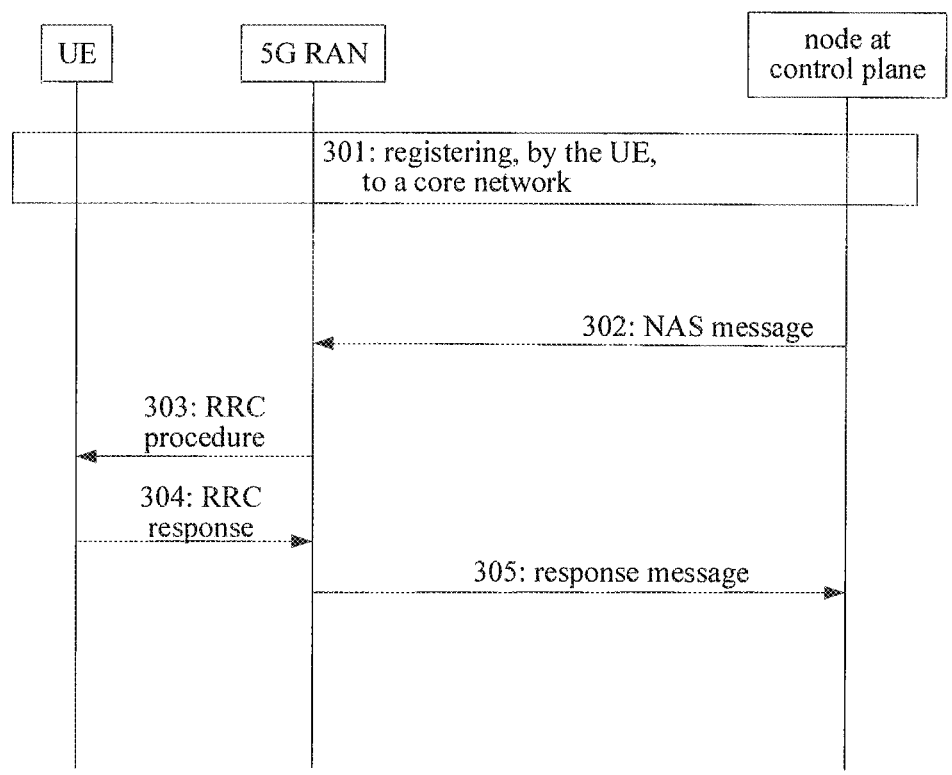
FIG. 3 is a schematic view showing another network access method according to one embodiment of the present disclosure.

The temporary identifier may be understood as a temporary identifier allocated by the core network node for the UE when the UE accesses the core network node through the first RAN, so as to enable the UE to access the core network node in the first RAN. In addition, when the UE accesses the first RAN, the UE may access a core network through the first RAN. For example, when the first RAN is a 5G RAN, as shown in FIG. 3, in Step 301, the UE may access the 5G RAN and initiate a registration procedure so as to be registered in the core network. In Step 302, the node at the control plane of the core network may allocate the temporary identifier carried in a returned Non-Access Stratum (NAS) message for the UE. In Step 303, a 5G RAN node may transmit the temporary identifier to the UE, so as to perform a RRC procedure. In Step 304, the UE may return a RRC response to the 5G RAN node. In Step 305, the 5G RAN node may return a response message to the node at the control plane of the 5G core network. Through the above steps, the UE may access the core network via the 5G RAN, and acquire the temporary identifier allocated by the core network node for the UE.

Figure 4:
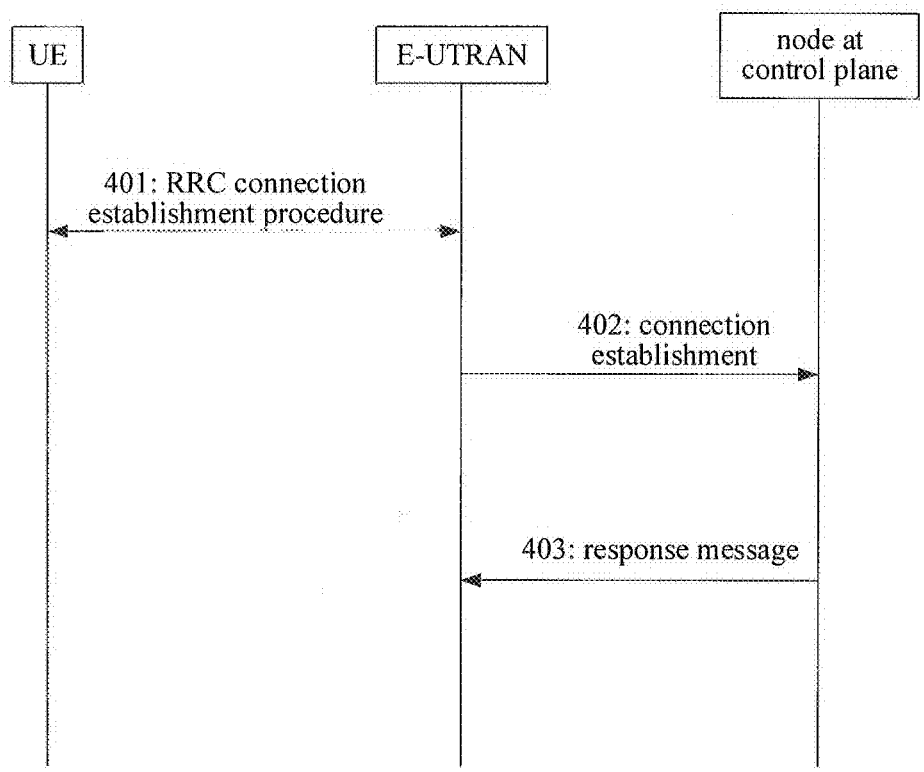
FIG. 4 is a schematic view showing yet another network access method according to one embodiment of the present disclosure.

In addition, the connection establishment request includes the temporary identifier, so the second RAN may select the core network node as the network node that the UE accesses via the second RAN by using the temporary identifier. For example, the second RAN may transmit the connection establishment request to the core network node, and the connection establishment request may include the temporary identifier and/or an identifier of the UE, e.g., an International Mobile Subscriber Identification Number (IMSI) of the UE, so as to enable the second RAN be connected to the core network node, i.e., to enable the UE to access the core network in the second RAN. For example, when the second RAN is an E-UTRAN for example, as shown in FIG. 4, in Step 401, the UE may establish the RRC connection with the E-UTRAN, i.e., transmit a first connection establishment request to an E-UTRAN node. In this step, the UE may acquire the identifier information of the core network node in accordance with the temporary identifier allocated by the core network node and received when the UE accesses the first RAN. At this time, a message transmitted in Step 401 may include the identifier information of the core network node, or an identifier of the UE (e.g., the above-mentioned temporary identifier and/or the IMSI of the UE). Upon the receipt of the message, the E-UTRAN node may select the core network node by using the identifier information of the core network node or the temporary identifier, and in Step 402, the E-UTRAN may transmit a connection establishment request, i.e., a second connection establishment request, to the core network node. The connection establishment request may be an NAS message, and the connection establishment request may include the identifier of the UE or the temporary identifier. Upon the receipt of the connection establishment request, the core network node may manage and associate context information of the UE in the first RAN and the second RAN in accordance with the identifier of the UE or the temporary identifier, and return a response message to the E-UTRAN node in Step 403. Through the above steps, it is able for the UE to access the core network in the second RAN.

In a possible embodiment of the present disclosure, the network node includes the core network node and the aggregation node, the core network node is configured to allocate a temporary identifier for the UE when the UE accesses the first RAN, and the temporary identifier includes identifier information of the core network node. Step 201 may include receiving and storing, by the UE, the temporary identifier and identifier information of the aggregation node, and the UE in the first RAN establishes the connection to the core network node through the aggregation node.

It should be appreciated that, the above aggregation node may be an aggregation node that connects the first RAN to the core network node, i.e., the aggregation node is connected between the first RAN and the core network node, when the UE accesses the first RAN, i.e., when the UE accesses the core network through the first RAN. When the UE accesses the core network through the second RAN, the second RAN may select the aggregation node as an aggregation node connected to the core network node in accordance with the identifier information of the aggregation node, so as to enable the aggregation node and the core network node for the UE in the first RAN to be the same as those in the second RAN respectively.

In a possible embodiment of the present disclosure, the identifier information of the aggregation node is transmitted by the aggregation node to the UE when the aggregation node has received the temporary identifier from the core network node, and the aggregation node is configured to manage and associate context information of the UE by using the temporary identifier.

Figure 5:
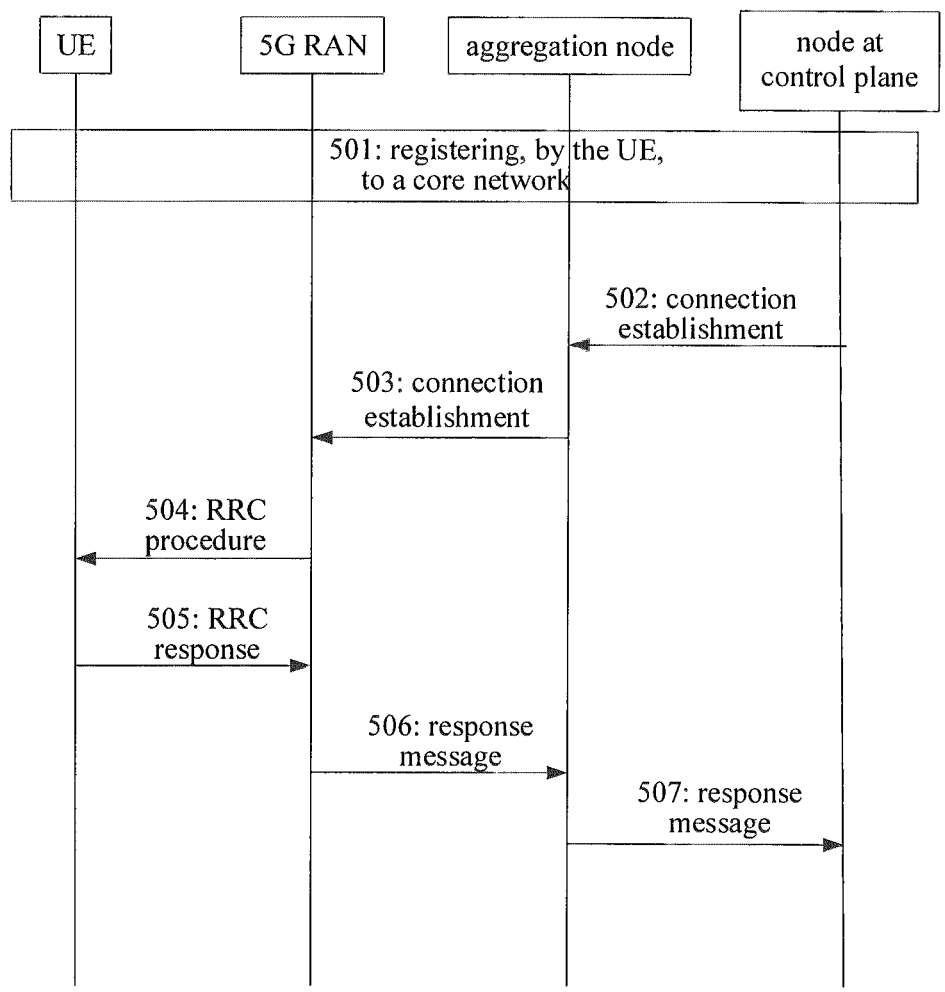
FIG. 5 is a schematic view showing yet another network access method according to one embodiment of the present disclosure.

During the implementation, the temporary identifier may be transmitted from the core network node to the aggregation node. The aggregation node may be further configured to store therein the temporary identifier, transmit the identifier information of the aggregation node to the UE, and manage and associate the context information of the UE by using the temporary identifier. The context information may include context information of the UE in the first RAN and context information of the UE in the second RAN. For example, when the first RAN is a 5G RAN for example, as shown in FIG. 5, in Step 501, the UE may perform a registration procedure to the network through the 5G RAN. The core network node may allocate the temporary identifier for the UE, and transmit the temporary identifier to the aggregation node through a connection establishment request, i.e., a third connection establishment request in Step 502. The connection establishment request may be an NAS message. The aggregation node may store therein the temporary identifier, and upon the receipt of the temporary identifier allocated by the core network node for the UE, the aggregation node may manage and associate the context information of the UE by using the temporary identifier. The aggregation node further needs to transmit the identifier information of the aggregation node and the temporary identifier to the UE. At this time, the aggregation node may transmit transparently the identifier information of the aggregation node and the temporary identifier to the UE through the 5G RAN node. Alternatively, in Step 503, the aggregation node may transmit the identifier information of the aggregation node and the temporary identifier to the 5G RAN node, and then in Step 504, the 5G RAN node may transmit the identifier information of the aggregation node and the temporary identifier to the UE. The UE may then store the identifier information of the aggregation node and the temporary identifier allocated by the core network for the UE. In addition, in Steps 505 to 507, the UE may return response messages to the core network node. Through the above steps, it is able for the UE to access the first RAN and store therein the temporary identifier as well as the identifier information of the aggregation node.

In a possible embodiment of the present disclosure, the connection establishment request may include the identifier information of the aggregation node and the temporary identifier. The second RAN may be configured to select the aggregation node as an aggregation node for the UE in the second RAN. The aggregation node may be configured to manage and associate the context information of the UE by using the temporary identifier, and deliver a message transmitted by the UE in the second RAN through an interface between the aggregation node and the core network node established by the UE in the first RAN.

Figure 6:
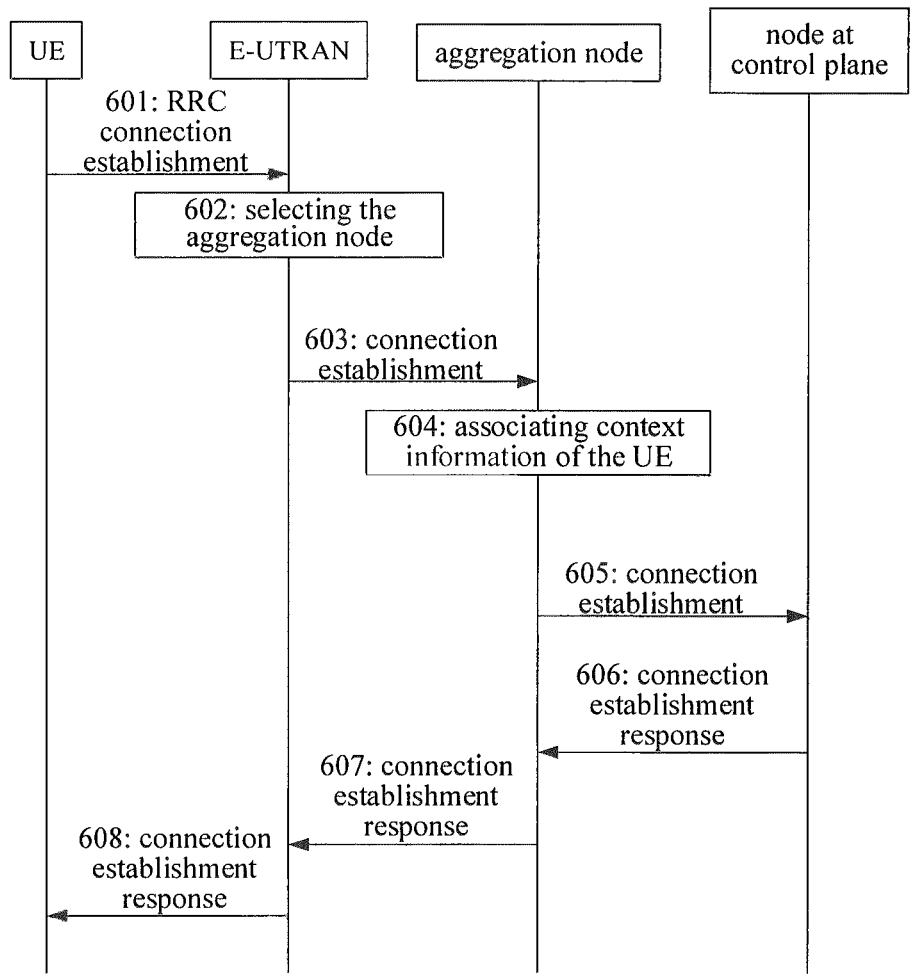
FIG. 6 is a schematic view showing yet another network access method according to one embodiment of the present disclosure.

During the implementation, upon the acquisition of the identifier information and the temporary identifier, the second RAN may select the aggregation node as an aggregation node that the UE accesses via the second RAN by using the identifier information. To be specific, during the selection, the second RAN may transmit a connection establishment request to the aggregation node for requesting the establishment of the connection with the aggregation node, and the connection establishment request may include the temporary identifier. In this way, the aggregation node may be configured to manage and associate the context information of the UE by using the temporary identifier, and deliver a message transmitted by the UE in the second RAN through an interface between the aggregation node and the core network node established by the UE in the first RAN. The interface between the aggregation node and the core network node may be understood as an interface through which the core network node is connected to the aggregation node when the UE accesses the core network in the first RAN. In this way, when the UE is to access the core network in the second RAN, the interface between the aggregation node and the core network node of the UE in the first RAN may be directly adopted, and it is unnecessary to provide any other interface. In addition, the aggregate node and the core network node for the UE in the first RAN are the same as those in the second RAN, so it is able to reduce network resources. For example, when the second RAN is an E-UTRAN, as shown in FIG. 6, in Step 601, the UE may establish the signaling connection in an E-UTRAN system, i.e., the UE may transmit a first connection establishment request to the E-UTRAN node. The connection establishment request may be a RRC connection establishment request, i.e., a RRC message which may include the temporary identifier and the identifier information of the aggregation node stored by the UE when the UE accesses the first RAN. In Step 602, the E-UTRAN node may select the aggregation node by using the identification information of the aggregation node, and in Step 603, it may initiate (i.e., transmit) a connection establishment request to the aggregation node. At this time, the connection establishment request includes the temporary identifier allocated by the core network node for the UE. In Step 604, the aggregation node may acquire the context information of the UE in accordance with the temporary identifier allocated by the core network node for the UE, and the context information may include context information of the UE in the first RAN and context information of the UE in the second RAN. The aggregation node may transmit a message to the core network node through the connection between the aggregation node and the node at the control plane of the core network established by the UE when the UE accesses the first RAN. For example, the aggregation node may transmit the acquired context information to the core network node, or deliver the message transmitted by the UE in the second RAN to the core network node. In addition, in Step 605, the aggregation node may further transmit a connection establishment request to the core network node. In Steps 606 to 608, the core network node may return response messages to the UE. Through the above steps, it is able for the UE to access the second RAN.

During the implementation, the temporary identifier may be allocated by the core network node for the UE, and the identifier information of the aggregation node may be transmitted by the aggregation node to the UE. In this way, it is able to select the same core network node and the same aggregation node for the UE when the UE resides in the first RAN and the second RAN simultaneously, thereby to manage the information of the UE in an effective manner.

In a possible embodiment of the present disclosure, the temporary identifier may be a first temporary identifier. Step 201 may include receiving and storing, by the UE, the first temporary identifier and a second temporary identifier allocated by the aggregation node for the UE, wherein the second temporary identifier includes the identifier information of the aggregation node.

Figure 7:
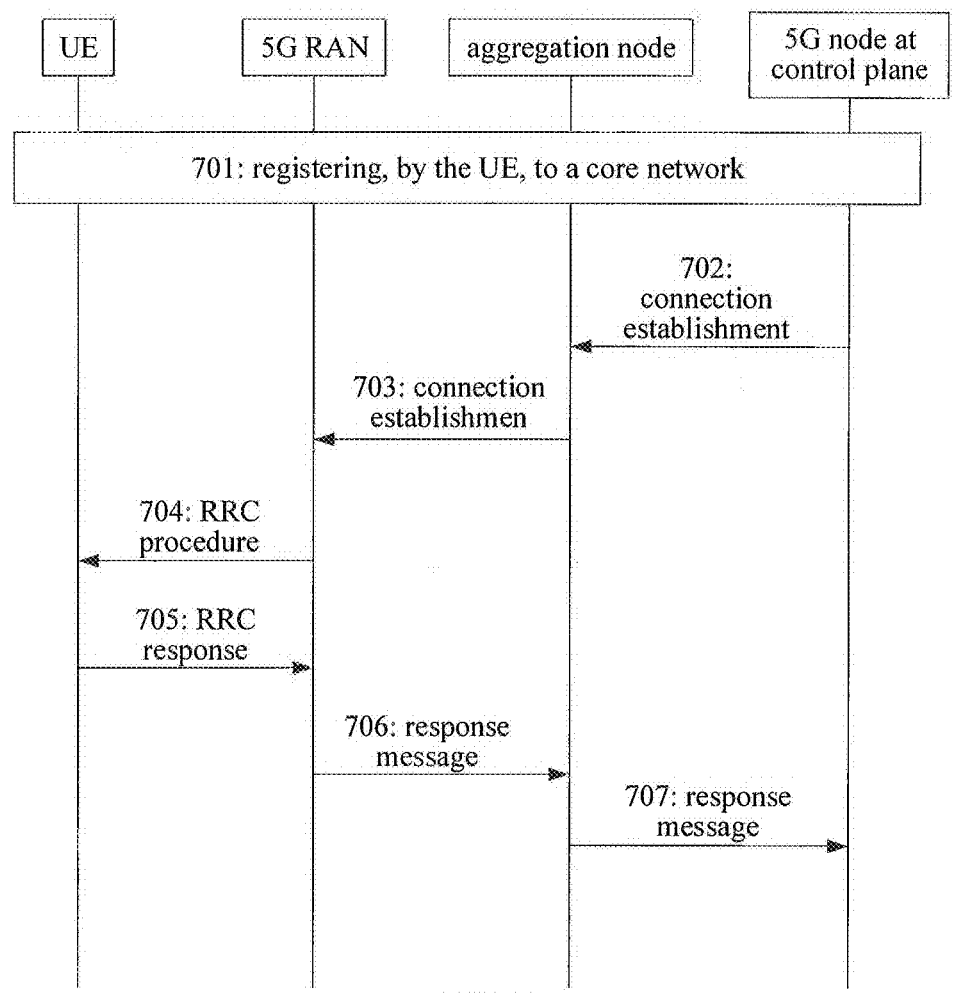
FIG. 7 is a schematic view showing yet another network access method according to one embodiment of the present disclosure.

The second temporary identifier may be allocated for the UE when the UE accesses the first RAN and the aggregation node has received the first temporary identifier from the core network node. In addition, the first temporary identifier and the second temporary identifier may be transmitted by the aggregation node to the UE. For example, when the first RAN is a 5G RAN, as shown in FIG. 7, in Step 701, the UE may perform a registration procedure in the network through the 5G RAN. The core network node may allocate the temporary identifier (i.e., the first temporary identifier) for the UE, and transmit the temporary identifier to the aggregation node through a connection establishment request in Step 702. The connection establishment request may be an NAS message. The aggregation node may allocate the temporary identifier (i.e., the second temporary identifier) for the UE, and the temporary identifier includes the identifier information of the aggregation node. The aggregation node may also manage and associate the context information of the UE by using the temporary identifier. The aggregation node may transmit the above temporary identifier to the UE, and the core network node may transmit the temporary information allocated for the UE to the UE too. The two temporary identifiers may be transmitted transparently to the UE through the 5G RAN node. In a possible embodiment of the present disclosure, in Step 703, the two temporary identifiers may be transmitted to the 5G RAN node, and then in Step 704, the 5G RAN node may transmit the two temporary identifiers to the UE. The UE may store therein the temporary identifier allocated by the aggregation node for the UE and the temporary identifier allocated by the core network node for the UE. In addition, the UE may further return response message to the core network node in Steps 705 to 707. Through the above steps, it is able for the UE to access the first RAN and store the first temporary identifier as well as the second temporary identifier.

In a possible embodiment of the present disclosure, the connection establishment request may include the first temporary identifier and the second temporary identifier. The RAN may be configured to select the aggregation node as an aggregation node that the UE accesses via the second RAN, and transmit the second temporary identifier to the aggregation node. The aggregation node may be configured to manage and associate the context information of the UE by using the second temporary identifier.

Figure 8:
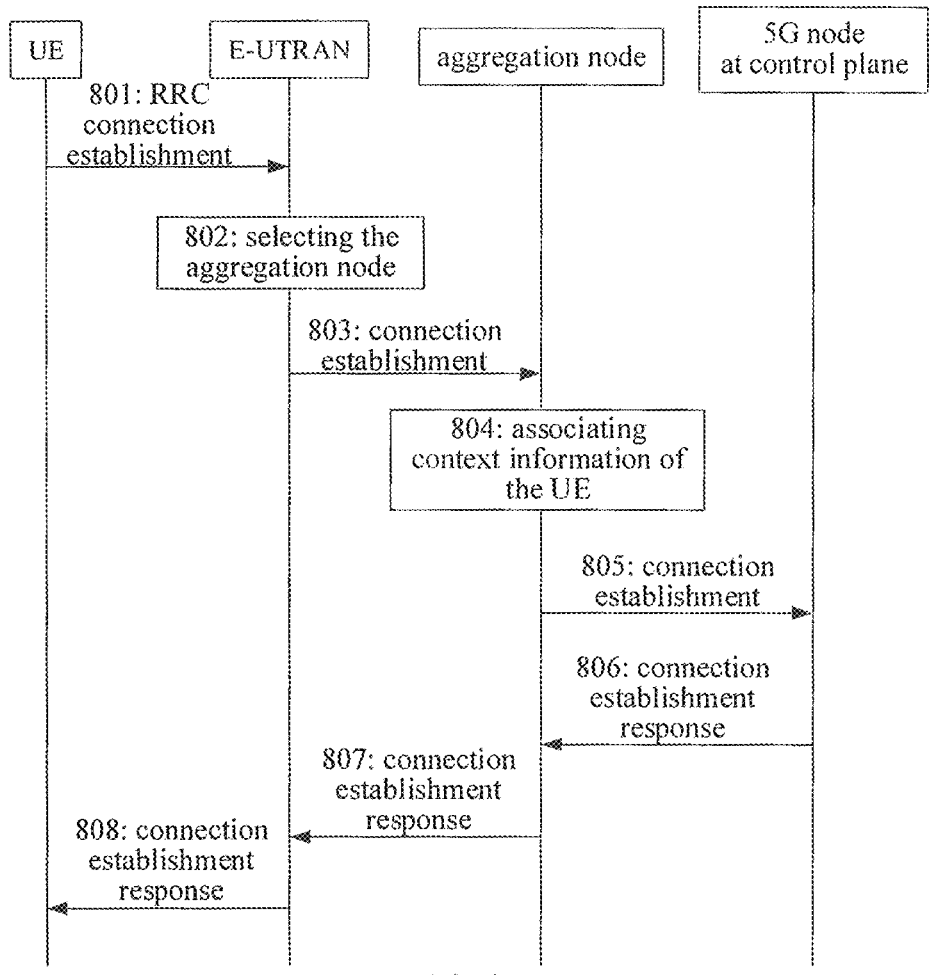
FIG. 8 is a schematic view showing yet another network access method according to one embodiment of the present disclosure.

During the implementation, upon the acquisition of the first temporary identifier and the second temporary identifier, the second RAN may select the aggregation node as an aggregation node that the UE accesses via the second RAN by using the second temporary identifier. To be specific, during the selection, the second RAN may transmit the connection establishment request to the aggregation node for requesting the establishment of the connection with the aggregation node, and the connection establishment request may include the first temporary identifier and the second temporary identifier, so the aggregation node may manage and associate the context information of the UE by using the first temporary identifier. The aggregation node may further deliver a message transmitted by the UE in the second RAN by using the first temporary identifier through an interface between the aggregation node and the core network node established by the UE in the first RAN. For example, when the second RAN is an E-UTRAN, as shown in FIG. 8, in Step 801, the UE may establish the connection in the E-UTRAN system, i.e., it may transmit a first connection establishment request to an E-UTRAN node. The connection establishment request may be a RRC connection establishment request, i.e., a RRC message which may include the temporary identifier (i.e., the first temporary identifier) allocated by the core network node for the UE and the temporary identifier (i.e., the second temporary identifier) allocated by the aggregation ode for the UE when the UE accesses the first RAN. In Step 802, the E-UTRAN node may acquire the aggregation node where the UE resides in the first RAN in accordance with the temporary identifier allocated by the aggregation node for the UE, and in Step 803, the E-UTRAN node may transmit a signaling connection establishment message, i.e., a second connection establishment request, to the aggregation node. The signaling connection establishment message may include the temporary identifier allocated by the aggregation node for the UE and the temporary identifier allocated by the core network node for the UE. In Step 804, the aggregation node may manage and associate the context information of the UE in accordance with the temporary identifier of the UE, and deliver the message to the core network node through the connection between the aggregation node and the node at the control plane of the core network established when the UE accesses the first RAN. In Step 805, the aggregation node may transmit the signaling connection establishment request to the node at the control plane of the core network. In addition, in Steps 806 to 808, the core network node may return response messages to the UE. Through the above steps, it is able for the UE to access the core network in the second RAN, and enable the aggregation node and the core network node for the UE in the first RAN to be the same as those in the second RAN respectively.

It should be appreciated that, the above possible embodiments may be implemented in a combined or separate manner, which will not be particularly defined herein.

According to the embodiments of the present disclosure, the UE stores the identifier information of the network node that the UE accesses via the first RAN, and transmits the connection establishment request including the identifier information of the network node to the second RAN while the UE maintains the connection to the first RAN, so as to enable the second RAN to select the network node for the UE as a network node that the UE accesses via the second RAN. As a result, it is able for the UE to reside in the network through the two RANs simultaneously.

Figure 9:
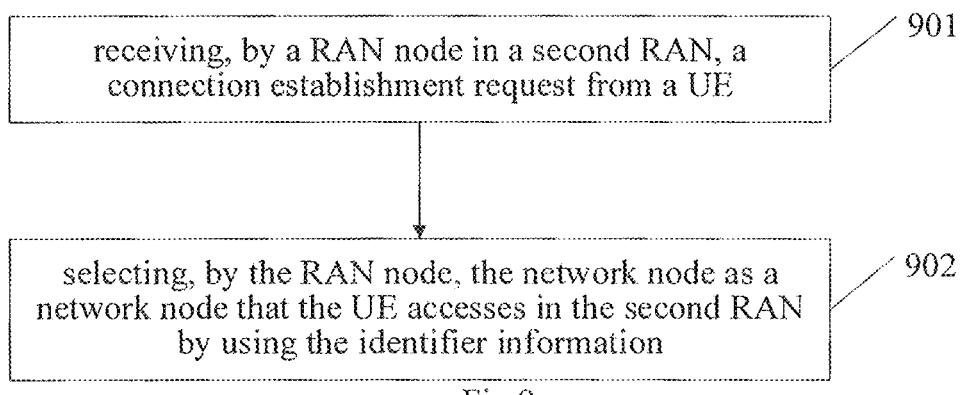
FIG. 9 is a flow chart of a network access method according to one embodiment of the present disclosure.

Based on the network in FIG. 1, the present disclosure further provides in some embodiments a network access method which, as shown in FIG. 9, includes: Step 901 of receiving, by a RAN node in a second RAN, a connection establishment request from a UE, the connection establishment request being transmitted by the UE when the connection to a first RAN is maintained and including identifier information of a network node for the UE in the first RAN; and Step 902 of selecting, by the RAN node, the network node as a network node that the UE accesses via the second RAN by using the identifier information.

The network node and the identifier information may refer to those mentioned in the embodiment as shown in FIG. 2. In addition, in Step 902, the selection of the network node may also refer to that mentioned in the embodiment as shown in FIG. 2. For example, the RAN node may select the network node and establish the connection with the network node so as to enable the UE to access the network node in the second RAN, which will not be particularly defined herein.

In a possible embodiment of the present disclosure, the network node may include a core network node, the core network node may be configured to allocate a temporary identifier for the UE when the UE accesses the first RAN, the temporary identifier may include identifier information of the core network node, and the connection establishment request may include the temporary identifier.

During the implementation, the RAN node may select the core network node as a core network node that the UE accesses via the second RAN. The selection procure thereof may refer to that mentioned in the embodiment as shown in FIG. 2, and thus will not be particularly defined herein.

In a possible embodiment of the present disclosure, the network node may include a core network node and an aggregation node, the core network node may be configured to allocate a temporary identifier for the UE when the UE accesses the first RAN, the temporary identifier may include identifier information of the core network node, the connection establishment request may include identification information of the aggregation node and the temporary identifier, and the aggregation node may be connected to the core network node by the UE in the first RAN.

During the implementation, the temporary identifier and the identifier information may refer to those mentioned in the embodiment as shown in FIG. 2, and thus will not be particularly defined herein.

In a possible embodiment of the present disclosure, Step 902 may include selecting, by the RAN node, the aggregation node as an aggregation node that the UE accesses via the second RAN by using the identifier information of the aggregation node, so as to enable the aggregation node to manage and associate context information of the UE by using the temporary identifier, and deliver a message transmitted by the UE in the second RAN through an interface between the aggregation node and the core network node established by the UE in the first RAN.

During the implementation, the selection of the aggregation node may refer to that mentioned in the embodiment as shown in FIG. 2. For example, during the selection of the aggregation node by the RAN node, the RAN node may transmit a connection establishment request including the temporary identifier to the aggregation node, so as to establish the connection with the aggregation node. The selection procedure thereof will not be particularly defined herein.

In a possible embodiment of the present disclosure, the temporary identifier is a first temporary identifier, the connection establishment request includes the first temporary identifier and a second temporary identifier, and the second temporary identifier is allocated by the aggregation node for the UE and includes the identifier information of the aggregation node. Step 902 may include selecting, by the RAN node, the network node as the network node that the UE accesses via the second RAN by using the second temporary identifier, so as to enable the aggregation node to manage and associate the context information of the UE by using the second temporary identifier.

During the implementation, the selection of the aggregation node may refer to that mentioned in the embodiment as shown in FIG. 2. For example, during the selection of the aggregation node by the RAN node, the RAN node may transmit a connection establishment request including the second temporary identifier and the first temporary identifier to the aggregation node, so as to establish the connection with the aggregation node. The selection procedure thereof will not be particularly defined herein.

According to the embodiments of the present disclosure, the RAN node of the second RAN receives the connection establishment request from the UE, and the connection establishment request is transmitted by the UE while the UE maintains the connection to the first RAN and includes the identifier information of the network node for the UE in the first RAN. Then, the RAN node selects the network node as the network node that the UE accesses via the second RAN by using the identifier information. As a result, it is able for the UE to reside in the network through the first RAN and the second RAN simultaneously.

Figure 10:
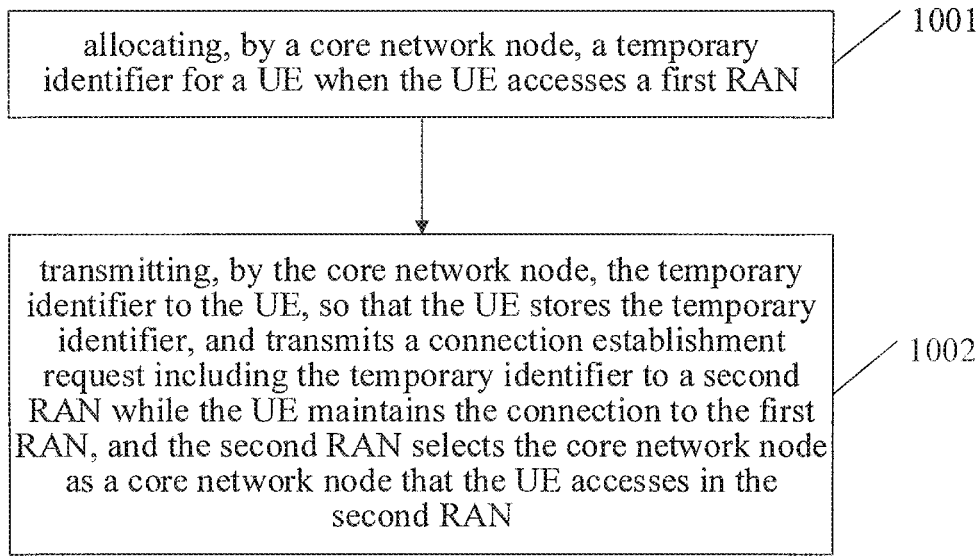
FIG. 10 is a flow chart of a network access method according to one embodiment of the present disclosure.

Based on the network in FIG. 1, the present disclosure further provides in some embodiments a network access method which, as shown in FIG. 10, includes: Step 1001 of allocating, by a core network node, a temporary identifier for a UE when the UE accesses a first RAN, the temporary identifier including identifier information of the core network node; and Step 1002 of transmitting, by the core network node, the temporary identifier to the UE, so that the UE stores the temporary identifier, and transmits a connection establishment request including the temporary identifier to a second RAN while the UE maintains the connection to the first RAN, and the second RAN selects the core network node as a core network node that the UE accesses via the second RAN.

The temporary identifier and the selection of the core network node by the UE may refer to those mentioned in the embodiment as shown in FIG. 2, and thus will not be particularly defined herein.

In a possible embodiment of the present disclosure, the transmitting, by the core network node, the temporary identifier to the UE may include transmitting, by the core network node, the temporary identifier to an aggregation node, so as to enable the aggregation node to transmit the temporary identifier and identifier information of the aggregation node to the UE. The aggregation node is an aggregation node through which a connected to the core network node is established by the UE in the first RAN.

During the implementation, the aggregation node and the identifier information may refer to that mentioned in the embodiment as shown in FIG. 2, and thus will not be particularly defined herein.

In a possible embodiment of the present disclosure, the network access method may further include receiving, by the core network node, a message delivered by the aggregation node through an interface between the aggregation node and the core network node established by the UE in the first RAN, wherein the message is transmitted by the UE in the second RAN.

During the implementation, the interface and the message may refer to those mentioned in the embodiment as shown in FIG. 2, and thus will not be particularly defined herein.

In a possible embodiment of the present disclosure, the temporary identifier is a first temporary identifier; and the identifier information of the aggregation node is a second temporary identifier allocated by the aggregation node for the UE, and the second temporary identifier comprises the identifier information of the aggregation node.

During the implementation, the first temporary identifier and the second temporary identifier may refer to those mentioned in the embodiment as shown in FIG. 2, and thus will not be particularly defined herein.

According to the embodiments of the present disclosure, the core network node allocates the temporary identifier for the UE when the UE accesses the first RAN, and the temporary identifier includes the identifier information of the core network node. Then, the core network node transmits the temporary identifier to the UE, so that the UE stores the temporary identifier, and transmits the connection establishment request including the temporary identifier to the second RAN while the UE maintains the connection to the first RAN, and the second RAN selects the core network node as a core network node that the UE accesses via the second RAN. As a result, it is able for the UE to reside in the network through the first RAN and the second RAN simultaneously.

Figure 11:
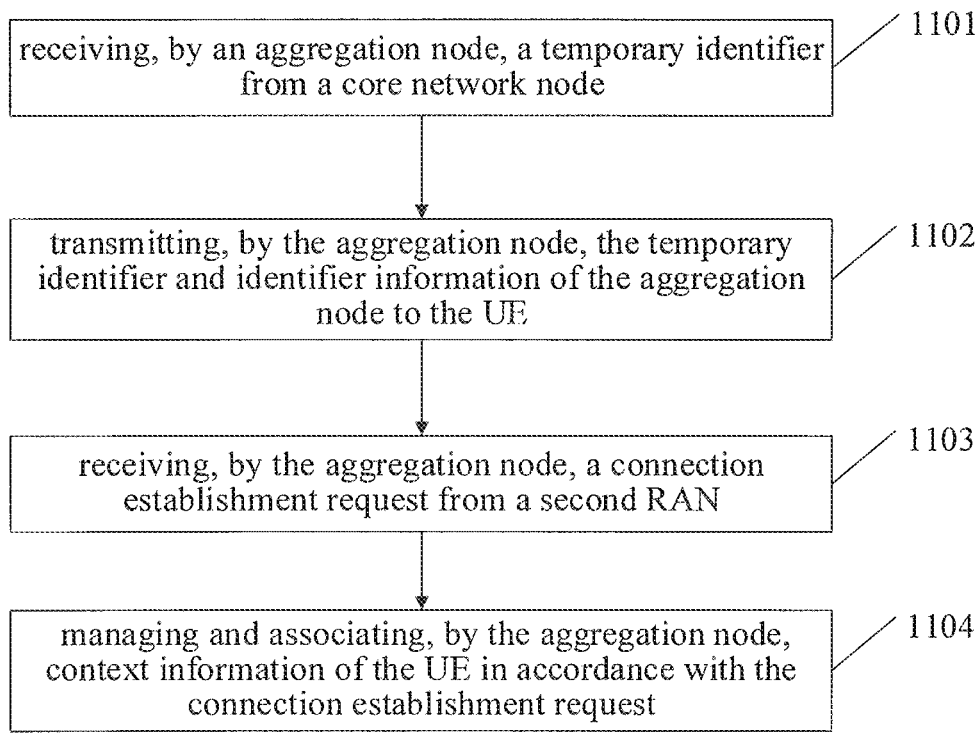
FIG. 11 is a flow chart of a network access method according to one embodiment of the present disclosure.

Based on the network in FIG. 1, the present disclosure further provides in some embodiments another network access method which, as shown in FIG. 11, includes: Step 1101 of receiving, by an aggregation node, a temporary identifier from a core network node, the temporary identifier being allocated by the core network node for a UE when the UE accesses a first RAN, and the temporary identifier including identifier information of the core network node; Step 1102 of transmitting, by the aggregation node, the temporary identifier and identifier information of the aggregation node to the UE, so as to enable the UE to establish the connection between the aggregation node and the core network node in the first RAN; Step 1103 of receiving, by the aggregation node, a connection establishment request from a second RAN, the connection establishment request being transmitted by the UE to the second RAN while the UE maintains the connection to the first RAN; and Step 1104 of managing and associating, by the aggregation node, context information of the UE in accordance with the connection establishment request.

The temporary identifier, the identifier information and the connection establishment request may refer to those mentioned in the embodiment as shown in FIG. 2, and thus will not be particularly defined herein. In addition, it should be appreciated that, the temporary identifier is allocated by the core network node for the UE when the UE accesses the first RAN, and transmitted to the UE through the aggregation node. Hence, when the temporary identifier and the identifier information of the aggregation node are transmitted to the UE, the connection between the aggregation node and the core network node established by the UE in the first RAN will be established. The connection establishment procedure may refer to that mentioned in the embodiment as shown in FIG. 2, and thus will not be particularly defined herein.

In a possible embodiment of the present disclosure, the network access method may further include delivering, by the aggregation node, a message transmitted by the UE in the second RAN through an interface between the aggregation node and the core network node established by the UE in the first RAN.

During the implementation, the interface and the delivery of the message may refer to those mentioned in the embodiment as shown in FIG. 2, and thus will not be particularly defined herein.

In a possible embodiment of the present disclosure, the connection establishment request from the second RAN includes the identifier information and the temporary identifier. Step 1104 may include managing and associating, by the aggregation node, the context information of the UE by using the temporary identifier.

The management and association of the context information of the UE may refer to that mentioned in the embodiment as shown in FIG. 2, and thus will not be particularly defined herein.

In a possible embodiment of the present disclosure, the temporary identifier may be a first temporary identifier. The network access method may further include allocating, by the aggregation node, a second temporary identifier for the UE, the identifier information of the aggregation node is the second temporary identifier, and the second temporary identifier includes the identifier information of the aggregation node.

In a possible embodiment of the present disclosure, the connection establishment request from the second RAN may include the first temporary identifier and the second temporary identifier. Step 1104 may include managing and associating, by the aggregation node, the context information of the UE by using the second temporary identifier.

During the implementation, the first temporary identifier and the second temporary identifier may refer to those mentioned in the embodiment as shown in FIG. 2, and thus will not be particularly defined herein.

According to the embodiments of the present disclosure, the aggregation node receives the temporary identifier from the core network node, and the temporary identifier is allocated by the core network node for the UE when the UE accesses the first RAN, and includes the identifier information of the core network node. Next, the aggregation node transmits the temporary identifier and the identifier information of the aggregation node to the UE, so as to enable the UE to establish the connection between the aggregation node and the core network node in the first RAN. Next, the aggregation node receives the connection establishment request from the second RAN, and the connection establishment request is transmitted by the UE to the second RAN while the UE maintains the connection to the first RAN. Then, the aggregation node manages and associates the context information of the UE in accordance with the connection establishment request. As a result, it is able for the UE to reside in the network through the first RAN and the second RAN simultaneously.

Figure 12:
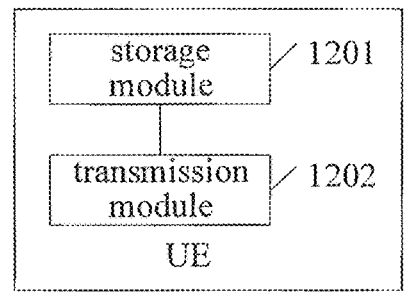
FIG. 12 is a schematic view showing a UE according to one embodiment of the present disclosure.

The present disclosure further provides in some embodiments a UE which, as shown in FIG. 12, includes: a storage module 1201 configured to store identifier information of a network node that the UE accesses via a first RAN; and a transmission module 1202 configured to transmit a connection establishment request comprising the identifier information of the network node to a second RAN while the UE maintains the connection to the first RAN, to enable the second RAN to select the network node for the UE as a network node that the UE accesses via the second RAN.

In a possible embodiment of the present disclosure, the network node includes a core network node, the core network node is configured to allocate a temporary identifier for the UE when the UE accesses the first RAN, and the temporary identifier includes identifier information of the core network node. The storage module is configured to receive and store the temporary identifier.

In a possible embodiment of the present disclosure, the network node includes a core network node and an aggregation node, the core network node is configured to allocate a temporary identifier for the UE when the UE accesses the first RAN, and the temporary identifier includes identifier information of the core network node. The storage module is configured to receive and store the temporary identifier and identifier information of the aggregation node, wherein the UE in the first RAN establishes a connection to the core network node through the aggregation node.

In a possible embodiment of the present disclosure, the identifier information of the aggregation node is transmitted by the aggregation node to the UE when the aggregation node has received the temporary identifier from the core network node, and the aggregation node is configured to manage and associate context information of the UE by using the temporary identifier.

In a possible embodiment of the present disclosure, the connection establishment request includes the identifier information of the aggregation node and the temporary identifier. The second RAN is configured to select the aggregation node as an aggregation node that the UE accesses via the second RAN, and the aggregation node is configured to manage and associate the context information of the UE by using the temporary identifier, and deliver a message transmitted by the UE in the second RAN through an interface between the aggregation node and the core network node established by the UE in the first RAN.

In a possible embodiment of the present disclosure, the temporary identifier is a first temporary identifier. The storage module is configured to receive and store the first temporary identifier and a second temporary identifier, wherein the second temporary identifier is allocated by the aggregation node for the UE and includes the identifier information of the aggregation node.

In a possible embodiment of the present disclosure, the connection establishment request includes the first temporary identifier and the second temporary identifier. The second RAN is configured to select the aggregation node as an aggregation node that the UE accesses via the second RAN, and transmit the second temporary identifier to the aggregation node. The aggregation node is configured to manage and associate the context information of the UE by using the second temporary identifier.

It should be appreciated that, the implementation of the UE may refer to that mentioned in the embodiments as shown in FIGS. 1-11 with a same beneficial effect, and thus will not be particularly defined herein.

Figure 13:
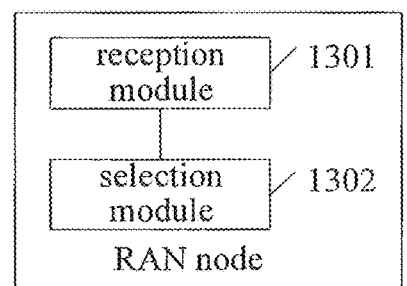
FIG. 13 is a schematic view showing a RAN node according to one embodiment of the present disclosure.

The present disclosure further provides in some embodiments a RAN node in a second RAN which, as shown in FIG. 13, includes: a reception module 1301 configured to receive a connection establishment request from a UE, the connection establishment request being transmitted by the UE while the UE maintains the connection to a first RAN, and the connection establishment request including identifier information of a network node that the UE accesses via the first RAN; and a selection module 1302 configured to select the network node as a network node that the UE accesses via the second RAN by using the identifier information.

In a possible embodiment of the present disclosure, the network node includes a core network node, the core network node is configured to allocate a temporary identifier for the UE when the UE accesses the first RAN, the temporary identifier includes identifier information of the core network node, and the connection establishment request includes the temporary identifier.

In a possible embodiment of the present disclosure, the network node includes a core network node and an aggregation node, the core network node is configured to allocate a temporary identifier for the UE when the UE accesses the first RAN, and the temporary identifier includes identifier information of the core network node. The connection establishment request includes identification information of the aggregation node and the temporary identifier, and the UE in the first RAN establishes a connection to the core network node through the aggregation node.

In a possible embodiment of the present disclosure, the selection module 1302 may be further configured to select the aggregation node as an aggregation node that the UE accesses via the second RAN by using the identifier information of the aggregation node, to enable the aggregation node to manage and associate context information of the UE by using the temporary identifier, and deliver a message transmitted by the UE in the second RAN through an interface between the aggregation node and the core network node established by the UE in the first RAN.

In a possible embodiment of the present disclosure, the temporary identifier is a first temporary identifier, the connection establishment request includes the first temporary identifier and a second temporary identifier, and the second temporary identifier is allocated by the aggregation node for the UE and includes the identifier information of the aggregation node. The selection module is configured to select the network node as the network node that the UE accesses via the second RAN by using the second temporary identifier, to enable the aggregation node to manage and associate the context information of the UE by using the second temporary identifier.

It should be appreciated that, the implementation of the RAN node may refer to that mentioned in the embodiments as shown in FIGS. 1-11 with a same beneficial effect, and thus will not be particularly defined herein.

Figure 14:
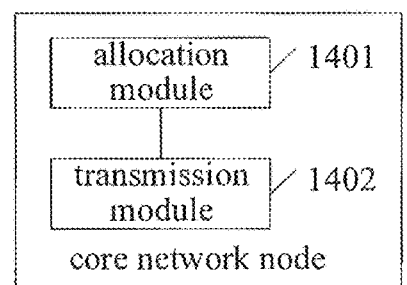
FIG. 14 is a schematic view showing a core network node according to one embodiment of the present disclosure.

The present disclosure further provides in some embodiments a core network node which, as shown in FIG. 14, includes: an allocation module 1401 configured to allocate a temporary identifier for a UE when the UE accesses a first RAN, the temporary identifier including identifier information of the core network node; and a transmission module 1402 configured to transmit the temporary identifier to the UE, to enable that the UE stores the temporary identifier, wherein the UE transmits a connection establishment request including the temporary identifier to a second RAN while the UE maintains the connection to the first RAN, and the second RAN selects the core network node as a core network node that the UE accesses via the second RAN.

In a possible embodiment of the present disclosure, the transmission module 1402 is further configured to transmit the temporary identifier to an aggregation node, so as to enable the aggregation node to transmit the temporary identifier and identifier information of the aggregation node to the UE. The UE in the first RAN establishes a connection to the core network node through the aggregation node.

Figure 15:
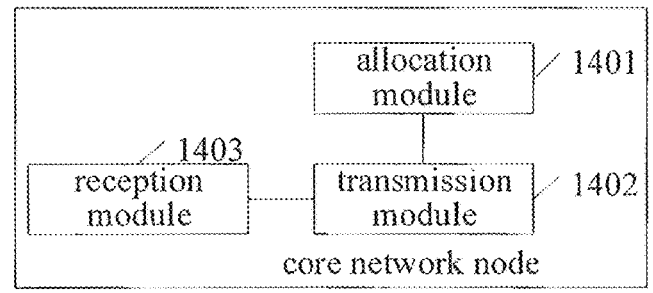
FIG. 15 is a schematic view showing another core network node according to one embodiment of the present disclosure.

In a possible embodiment of the present disclosure, as shown in FIG. 15, the core network node may further include a reception module 1403 configured to receive a message delivered by the aggregation node through an interface between the aggregation node and the core network node established by the UE in the first RAN, wherein the message is transmitted by the UE in the second RAN.

In a possible embodiment of the present disclosure, the temporary identifier is a first temporary identifier and the identifier information of the aggregation node is a second temporary identifier allocated by the aggregation node for the UE, and the second temporary identifier includes the identifier information of the aggregation node.

It should be appreciated that, the implementation of the core network node may refer to that mentioned in the embodiments as shown in FIGS. 1-11 with a same beneficial effect, and thus will not be particularly defined herein.

Figure 16:
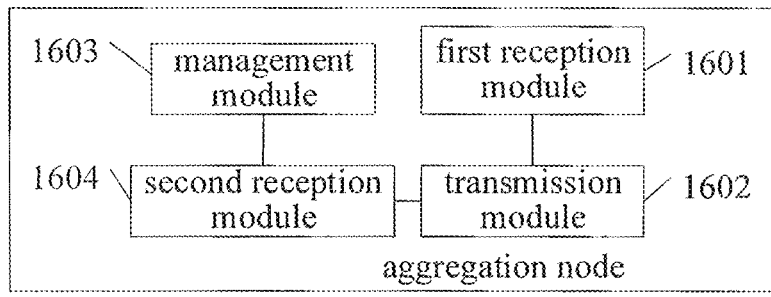
FIG. 16 is a schematic view showing an aggregation node according to one embodiment of the present disclosure.

The present disclosure further provides in some embodiments an aggregation node which, as shown in FIG. 16, includes: a first reception module 1601 configured to receive a temporary identifier from a core network node, the temporary identifier being allocated by the core network node for a UE when the UE accesses a first RAN, and the temporary identifier including identifier information of the core network node; a transmission module 1602 configured to transmit the temporary identifier and identifier information of the aggregation node to the UE, to enable the UE to establish the connection between the aggregation node and the core network node in the first RAN; a second reception module 1604 configured to receive a connection establishment request from a second RAN, the connection establishment request being transmitted by the UE to the second RAN while the UE maintains the connection to the first RAN; and a management module 1603 configured to manage and associate context information of the UE in accordance with the connection establishment request.

Figure 17:
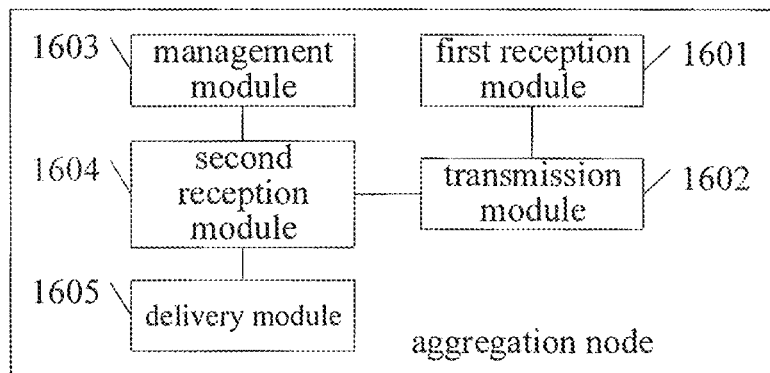
FIG. 17 is a schematic view showing another aggregation node according to one embodiment of the present disclosure.

In a possible embodiment of the present disclosure, as shown in FIG. 17, the aggregation node may further include a delivery module 1605 configured to deliver a message transmitted by the UE in the second RAN through an interface between the aggregation node and the core network node established by the UE in the first RAN.

In a possible embodiment of the present disclosure, the connection establishment request from the second RAN includes the identifier information and the temporary identifier; and the management module 1603 is further configured to manage and associate the context information of the UE by using the temporary identifier.

Figure 18:
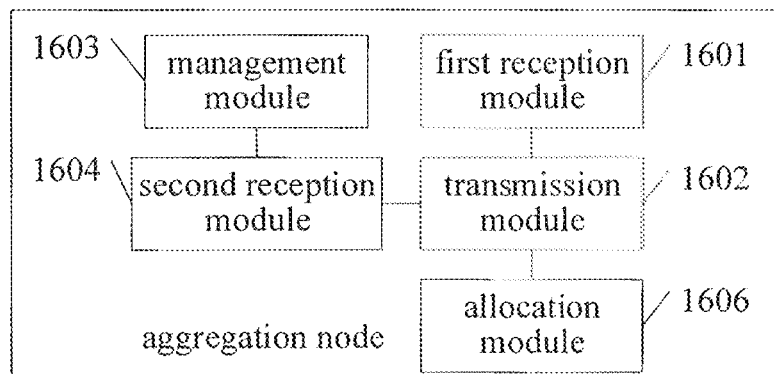
FIG. 18 is a schematic view showing yet another aggregation node according to one embodiment of the present disclosure.

In a possible embodiment of the present disclosure, the temporary identifier is a first temporary identifier. As shown in FIG. 18, the aggregation node may further include an allocation module 1606 configured to allocate a second temporary identifier for the UE, wherein the identifier information of the aggregation node is the second temporary identifier, and the second temporary identifier includes the identifier information of the aggregation node.

In a possible embodiment of the present disclosure, the connection establishment request from the second RAN includes the first temporary identifier and the second temporary identifier. The management module 1603 is further configured to manage and associate the context information of the UE by using the second temporary identifier.

It should be appreciated that, the implementation of the aggregation node may refer to that mentioned in the embodiments as shown in FIGS. 1-11 with a same beneficial effect, and thus will not be particularly defined herein.

Figure 19:
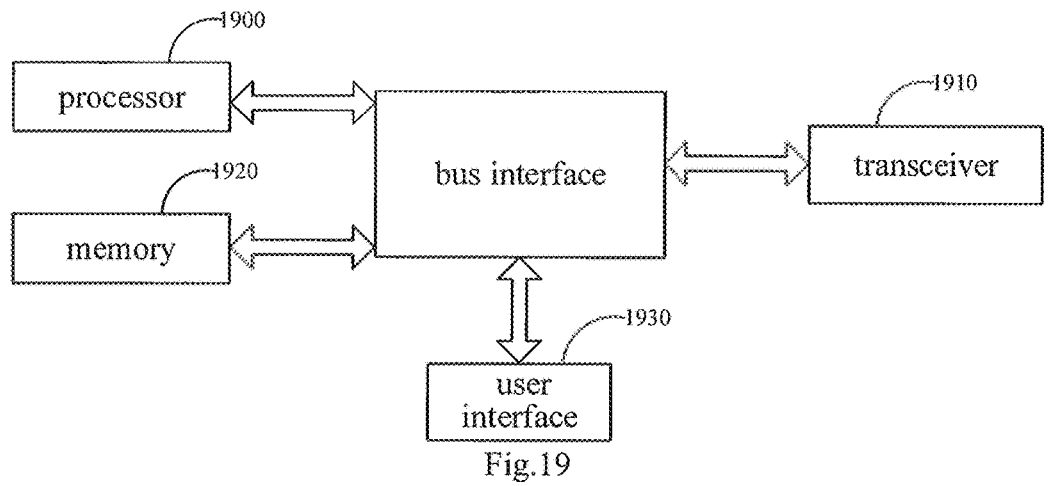
FIG. 19 is a schematic view showing another UE according to one embodiment of the present disclosure.

The present disclosure further provides in some embodiments a UE which, as shown in FIG. 19, includes a processor 1900, a transceiver 1910, a memory 1920, a user interface 1930, and a bus interface. The processor 1900 is configured to read a program stored in the memory 1920, so as to: store identifier information of a network node that the UE accesses via a first RAN; and transmit through the transceiver 1910 a connection establishment request to a second RAN while the UE maintains the connection to the first RAN, so as to enable the second RAN to select the network node for the UE as a network node that the UE accesses via the second RAN. The connection establishment request includes identifier information of the network node. The transceiver 1910 is configured to receive and transmit data under the control of the processor 1900.

In FIG. 19, bus architecture may include a number of buses and bridges connected to each other, so as to connect various circuits for one or more processors such as the processor 1900 and one or more memories such as the memory 1920. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 1910 may consist of a plurality of elements, i.e., a transmitter and a receiver for communication with any other devices over a transmission medium. With respect to different UEs, the user interface may also be provided for devices which are to be arranged inside or outside the UE, and these devices may include but not limited to a keypad, a display, a speaker, a microphone and a joystick. The processor 1900 may take charge of managing the bus architecture as well general processings, and the memory 1920 may store data therein for the operation of the processor 1900.

In a possible embodiment of the present disclosure, the network node includes a core network node, the core network node is configured to allocate a temporary identifier for the UE when the UE accesses the first RAN, the temporary identifier includes identifier information of the core network node. The processor 1900 performing on the identifier information stored in the network node that the first RAN resides comprises that: the processor 1900 receiving through the transceiver 1910 and storing the temporary identifier.

In a possible embodiment of the present disclosure, the network node includes a core network node and an aggregation node, the core network node is configured to allocate a temporary identifier for the UE when the UE accesses the first RAN, and the temporary identifier includes identifier information of the core network node. The processor 1900 performing on the identifier information stored in the network node that the first RAN resides comprises that: the processor 1900 receiving through the transceiver 1910 and storing the temporary identifier and identifier information of the aggregation node, wherein the UE in the first RAN establishes a connection to the core network node through the aggregation node.

In a possible embodiment of the present disclosure, the identifier information of the aggregation node is transmitted by the aggregation node to the UE when the aggregation node has received the temporary identifier from the core network node, and the aggregation node is configured to manage and associate context information of the UE by using the temporary identifier.

In a possible embodiment of the present disclosure, the connection establishment request includes the identifier information of the aggregation node and the temporary identifier. The second RAN is configured to select the aggregation node as an aggregation node that the UE accesses via the second RAN, and the aggregation node is configured to manage and associate the context information of the UE by using the temporary identifier, and deliver a message transmitted by the UE in the second RAN through an interface between the aggregation node and the core network node established by the UE in the first RAN.

In a possible embodiment of the present disclosure, the temporary identifier is a first temporary identifier. The processor 1900 receiving through the transceiver 1910 and storing the temporary identifier and the identification information of the aggregation node comprises: the processor 1900 receiving through the transceiver 1910 and storing the first temporary identifier and a second temporary identifier, wherein the second temporary identifier is allocated by the aggregation node for the UE and includes the identifier information of the aggregation node.

In a possible embodiment of the present disclosure, the connection establishment request includes the first temporary identifier and the second temporary identifier. The second RAN is configured to select the aggregation node as an aggregation node for the UE in the second RAN, and transmit the second temporary identifier to the aggregation node. The aggregation node is configured to manage and associate the context information of the UE by using the second temporary identifier.

It should be appreciated that, the implementation of the UE may refer to that mentioned in the embodiments as shown in FIGS. 1-11 with a same beneficial effect, and thus will not be particularly defined herein.

Figure 20:
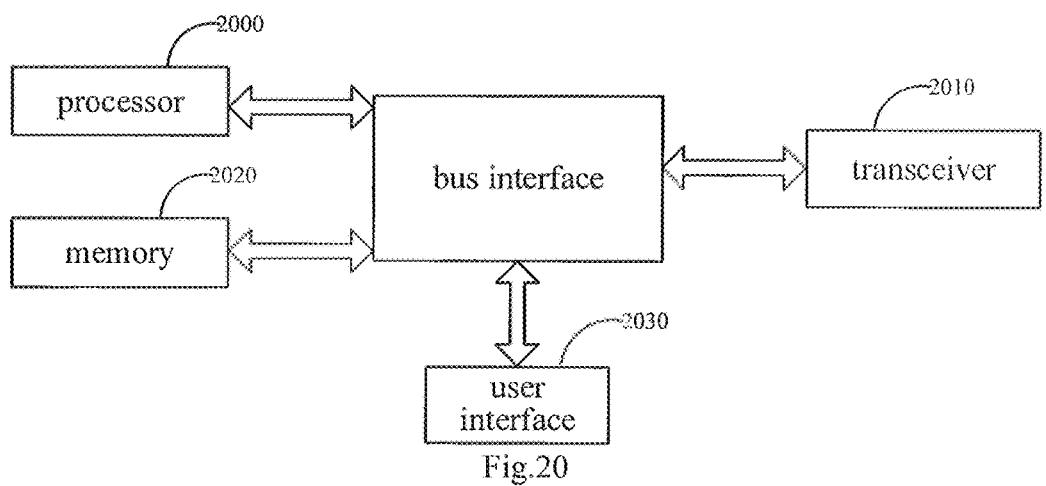
FIG. 20 is a schematic view showing another RAN node according to one embodiment of the present disclosure.

The present disclosure further provides in some embodiments a RAN node in a second RAN which, as shown in FIG. 20, includes a processor 2000, a transceiver 2010, a memory 2020, a user interface 2030 and a bus interface. The processor 2000 is configured to read a program stored in the memory 2020, so as to: receive through the transceiver 2010 a connection establishment request from a UE, the connection establishment request being transmitted by the UE when the connection to a first RAN is maintained and including identifier information of a network node for the UE in the first RAN; and select the network node as a network node that the UE accesses via the second RAN by using the identifier information. The transceiver 2010 is configured to receive and transmit data under the control of the processor 2000.

In FIG. 20, bus architecture may include a number of buses and bridges connected to each other, so as to connect various circuits for one or more processors such as the processor 2000 and one or more memories such as the memory 2020. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 2010 may consist of a plurality of elements, i.e., a transmitter and a receiver for communication with any other devices over a transmission medium. The processor 2000 may take charge of managing the bus architecture as well general processings, and the memory 2020 may store data therein for the operation of the processor 2000.

The processor 2000 may take charge of managing the bus architecture as well general processings, and the memory 2020 may store data therein for the operation of the processor 2000.

In a possible embodiment of the present disclosure, the network node includes a core network node, the core network node is configured to allocate a temporary identifier for the UE when the UE accesses the first RAN, and the temporary identifier includes identifier information of the core network node. The connection establishment request includes the temporary identifier.

In a possible embodiment of the present disclosure, the network node includes a core network node and an aggregation node, the core network node is configured to allocate a temporary identifier for the UE when the UE accesses the first RAN, the temporary identifier includes identifier information of the core network node, the connection establishment request includes identification information of the aggregation node and the temporary identifier, and the UE in the first RAN establishes a connection to the core network node through the aggregation node.

In a possible embodiment of the present disclosure, the processor 200 selecting the network node as the network node that the UE accesses via the second RAN by using the identifier information comprises: the processor 2000 selecting the aggregation node as an aggregation node that the UE accesses via the second RAN by using the identifier information of the aggregation node, so as to enable the aggregation node to manage and associate context information of the UE by using the temporary identifier, and deliver a message transmitted by the UE in the second RAN through an interface between the aggregation node and the core network node established by the UE in the first RAN.

In a possible embodiment of the present disclosure, the temporary identifier is a first temporary identifier, the connection establishment request includes the first temporary identifier and a second temporary identifier, and the second temporary identifier is allocated by the aggregation node for the UE and includes the identifier information of the aggregation node. The processor 2000 selecting the network node as the network node that the UE accesses via the second RAN by using the identifier information may include: the processor 2000 selecting the network node as the network node that the UE accesses via the second RAN by using the second temporary identifier, to enable the aggregation node to manage and associate the context information of the UE by using the second temporary identifier.

It should be appreciated that, the implementation of the RAN node may refer to that mentioned in the embodiments as shown in FIGS. 1-11 with a same beneficial effect, and thus will not be particularly defined herein.

Figure 21:
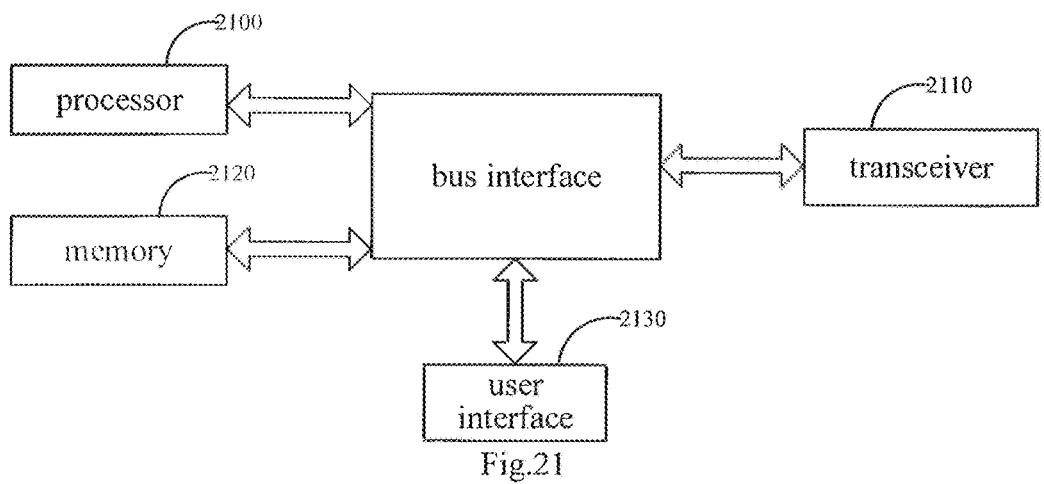
FIG. 21 is a schematic view showing yet another core network node according to one embodiment of the present disclosure.

The present disclosure further provides in some embodiments a core network node which, as shown in FIG. 21, includes a processor 2100, a transceiver 2110, a memory 2120, a user interface 2130 and a bus interface. The processor 2100 is configured to read a program stored in the memory 2120, so as to: allocate a temporary identifier for a UE when the UE accesses a first RAN, the temporary identifier including identifier information of the core network node; and transmit through the transceiver 2110 the temporary identifier to the UE, so that the UE stores the temporary identifier and transmits a connection establishment request including the temporary identifier to a second RAN while the UE maintains the connection to the first RAN, and the second RAN selects the core network node as a core network node that the UE accesses via the second RAN. The transceiver 2110 is configured to receive and transmit data under the control of the processor 2100.

In FIG. 21, bus architecture may include a number of buses and bridges connected to each other, so as to connect various circuits for one or more processors such as the processor 2100 and one or more memories such as the memory 2120. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 2110 may consist of a plurality of elements, i.e., a transmitter and a receiver for communication with any other devices over a transmission medium. With respect to different UEs, the user interface 2130 may also be provided for devices which are to be arranged inside or outside the equipment, and these devices may include but not limited to a keypad, a display, a speaker, a microphone and a joystick. The processor 2100 may take charge of managing the bus architecture as well general processings, and the memory 2120 may store data therein for the operation of the processor 2100.

In a possible embodiment of the present disclosure, the processor 2100 transmitting the temporary identifier to the UE through the transceiver 2110 includes: the processor 2100 transmitting the temporary identifier to an aggregation node through the transceiver 2110, to enable the aggregation node to transmit the temporary identifier and identifier information of the aggregation node to the UE, wherein the UE in the first RAN establishes a connection to the core network node through the aggregation node.

In a possible embodiment of the present disclosure, the processor 2100 is further configured to receive through the transceiver 2110 a message delivered by the aggregation node through an interface between the aggregation node and the core network node established by the UE in the first RAN, wherein the message is transmitted by the UE in the second RAN.

In a possible embodiment of the present disclosure, the temporary identifier is a first temporary identifier, and the identifier information of the aggregation node includes a second temporary identifier allocated by the aggregation node for the UE, and the second temporary identifier includes the identifier information of the aggregation node.

It should be appreciated that, the implementation of the core network node may refer to that mentioned in the embodiments as shown in FIGS. 1-11 with a same beneficial effect, and thus will not be particularly defined herein.

Figure 22:
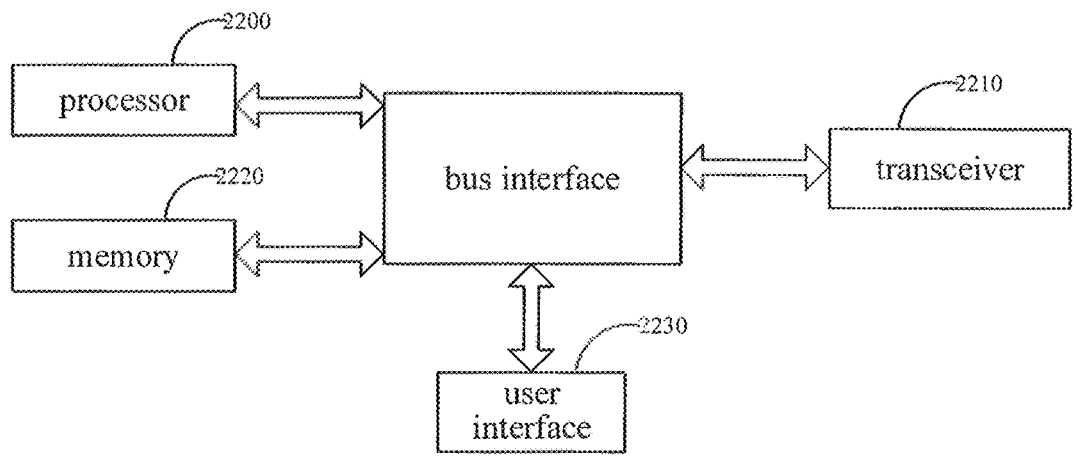
FIG. 22 is a schematic view showing yet another aggregation node according to one embodiment of the present disclosure.

The present disclosure further provides in some embodiments an aggregation node which, as shown in FIG. 22, includes a processor 2200, a transceiver 2210, a memory 2220, a user interface 2230 and a bus interface. The processor 2200 is configured to read a program stored in the memory 2220, so as to: receive through the transceiver 2210 a temporary identifier from a core network node, the temporary identifier being allocated by the core network node for a UE when the UE accesses a first RAN and including identifier information of the core network node; transmit through the transceiver 2210 the temporary identifier and identifier information of the aggregation node to the UE, so as to enable the UE to establish the connection between the aggregation node and the core network node in the first RAN; receive through the transceiver 2210 a connection establishment request from a second RAN, the connection establishment request being transmitted by the UE to the second RAN while the UE maintains the connection to the first RAN; and manage and associate context information of the UE in accordance with the connection establishment request. The transceiver 2210 is configured to receive and transmit data under the control of the processor 2200.

In FIG. 22, bus architecture may include a number of buses and bridges connected to each other, so as to connect various circuits for one or more processors such as the processor 2200 and one or more memories such as the memory 2220. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 2210 may consist of a plurality of elements, i.e., a transmitter and a receiver for communication with any other devices over a transmission medium. The processor 2200 may take charge of managing the bus architecture as well general processings, and the memory 2220 may store data therein for the operation of the processor 2200.

The processor 2200 may take charge of managing the bus architecture as well general processings, and the memory 2220 may store data therein for the operation of the processor 2200.

In a possible embodiment of the present disclosure, the processor 2200 is further configured to deliver through the transceiver 2210 a message transmitted by the UE in the second RAN through an interface between the aggregation node and the core network node established by the UE in the first RAN.

In a possible embodiment of the present disclosure, the connection establishment request from the second RAN includes the identifier information and the temporary identifier. The processor 2200 managing and associating the context information of the UE in accordance with the connection establishment request includes: managing and associating the context information of the UE by using the temporary identifier.

In a possible embodiment of the present disclosure, the temporary identifier is a first temporary identifier. The processor 2200 is further configured to allocate a second temporary identifier for the UE, wherein the identifier information of the aggregation node is the second temporary identifier, and the second temporary identifier includes the identifier information of the aggregation node.

In a possible embodiment of the present disclosure, the connection establishment request from the second RAN includes the first temporary identifier and the second temporary identifier. The processor 2200 managing and associating the context information of the UE in accordance with the connection establishment request includes: managing and associating the context information of the UE by using the second temporary identifier.

It should be appreciated that, the implementation of the aggregation node may refer to that mentioned in the embodiments as shown in FIGS. 1-11 with a same beneficial effect, and thus will not be particularly defined herein.

Figure 23:
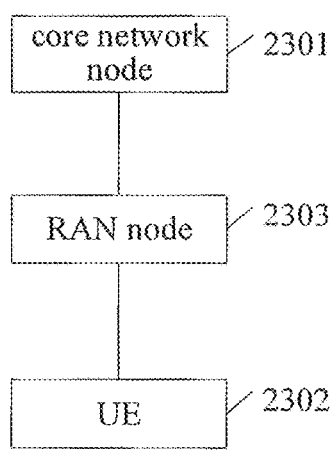
FIG. 23 is a schematic view showing a network access system according to one embodiment of the present disclosure.

The present disclosure further provides in some embodiments a network access system which, as shown in FIG. 23, includes: a core network node 2301 configured to allocate a temporary identifier for a UE 2302 when the UE 2302 accesses a first RAN, and transmit the temporary identifier including identifier information of the core network node to the UE; the UE 2302 configured to store therein the temporary identifier, and transmit a connection establishment request to a second RAN while the UE maintains the connection to the first RAN, the connection establishment request including the temporary identifier; and a RAN node 2303 in the second RAN configured to select the core network node as a core network node that the UE accesses via the second RAN by using the temporary identifier.

In the embodiments of the present disclosure, the implementations of the core network node 2301, the UE 2302 and the RAN node 2303 may refer to those as shown in FIGS. 1-22 with a same beneficial effect, and thus will not be particularly defined herein.

Figure 24:
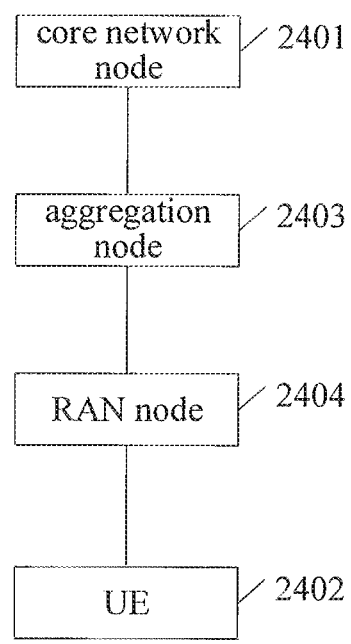
FIG. 24 is a schematic view showing another network access system according to one embodiment of the present disclosure.

The present disclosure further provides in some embodiments a network access system which, as shown in FIG. 24, includes: a core network node 2401 configured to allocate a temporary identifier for a UE 2402 when the UE 2042 accesses a first RAN, and transmit the temporary identifier including identifier information of the core network node to an aggregation node; the aggregation node 2403 configured to transmit the temporary identifier and identifier information of the aggregation node to the UE 2402, so as to enable the UE to establish the connection between the aggregation node and the core network node in the first RAN; the UE 2402 configured to store therein the temporary identifier and the identifier information, and transmit a connection establishment request to a second RAN while the UE maintains the connection to the first RAN, the connection establishment request including the temporary identifier and the identifier information; and a RAN node 2404 in the second RAN configured to select the aggregation node as an aggregation node that the UE 2402 accesses via the second RAN by using the identifier information.

In the embodiments of the present disclosure, the implementations of the core network node 2401, the UE 2402, the aggregation node 2403 and the RAN node 2404 may refer to those as shown in FIGS. 1-22 with a same beneficial effect, and thus will not be particularly defined herein.

It should be further appreciated that, in the embodiment of the present disclosure, the device and method may be implemented in any other ways. For example, the embodiments for the apparatus are merely for illustrative purposes, and the modules or units are provided merely on the basis of their logic functions. During the actual implementation, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software including the functional units.

The functional units implemented in a software form may be stored in a computer-readable medium. These software functional units may be stored in a storage medium and include several instructions so as to enable a computer device (a personal computer, a server or network device) to execute parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A network access method, comprising:
   storing, by a User Equipment (UE), identifier information of a network node that the UE accesses via a first Radio Access Network (RAN); and
   transmitting, by the UE, a connection establishment request comprising the identifier information of the network node to a second RAN while the UE maintains a connection to the first RAN, to enable the second RAN to select the same network node for the UE as a network node that the UE accesses via the second RAN,
   wherein the network node comprises a core network node, the core network node is configured to allocate a temporary identifier for the UE when the UE accesses the first RAN, to enable the first RAN to find the core network node that has allocated the temporary identifier, and the temporary identifier consists of identifier information of the core network node and identifier information of the UE; and
   the storing, by the UE, the identifier information of the network node that the UE accesses via the first RAN comprises: receiving and storing, by the UE, the temporary identifier.

2. The network access method according to claim 1, wherein
   the network node further comprises an aggregation node; and
   the storing, by the UE, the identifier information of the network node that the UE accesses via the first RAN comprises: receiving and storing, by the UE, the temporary identifier and identifier information of the aggregation node, wherein the UE in the first RAN establishes a connection to the core network node through the aggregation node.

3. The network access method according to claim 2, wherein
   the identifier information of the aggregation node is transmitted by the aggregation node to the UE when the aggregation node has received the temporary identifier from the core network node, and the aggregation node is configured to manage and associate context information of the UE by using the temporary identifier.

4. The network access method according to claim 2, wherein the connection establishment request comprises the identifier information of the aggregation node and the temporary identifier,
   wherein the second RAN is configured to select the aggregation node as an aggregation node that the UE accesses via the second RAN, and the aggregation node is configured to manage and associate context information of the UE by using the temporary identifier, and deliver a message transmitted by the UE in the second RAN through an interface between the aggregation node and the core network node established by the UE in the first RAN.

5. The network access method according to claim 2, wherein
the temporary identifier is a first temporary identifier; and
the receiving and storing, by the UE, the temporary identifier and the identifier information of the aggregation node comprises: receiving and storing, by the UE, the first temporary identifier and a second temporary identifier, wherein the second temporary identifier is allocated by the aggregation node for the UE and comprises the identifier information of the aggregation node.

6. The network access method according to claim 5, wherein
the connection establishment request comprises the first temporary identifier and the second temporary identifier;
the second RAN is configured to select the aggregation node as an aggregation node that the UE accesses via the second RAN, and transmit the second temporary identifier to the aggregation node; and
the aggregation node is configured to manage and associate context information of the UE by using the second temporary identifier.

7. A network access method, comprising:
receiving, by a RAN node in a second RAN, a connection establishment request from a UE, the connection establishment request being transmitted by the UE while the UE maintains a connection to a first RAN, and the connection establishment request comprising identifier information of a network node that the UE accesses via the first RAN; and
selecting, by the RAN node, the network node as a network node that the UE accesses via the second RAN by using the identifier information,
wherein the network node comprises a core network node, the core network node is configured to allocate a temporary identifier for the UE when the UE accesses the first RAN, to enable the first RAN to find the core network node that has allocated the temporary identifier, the temporary identifier consists of identifier information of the core network node and identifier information of the UE, and the connection establishment request comprises the temporary identifier.

8. The network access method according to claim 7, wherein
the network node further comprises an aggregation node;
the connection establishment request further comprises identification information of the aggregation node, and the UE in the first RAN establishes a connection to the core network node through the aggregation node.

9. The network access method according to claim 8, wherein the selecting, by the RAN node, the network node as the network node that the UE accesses via the second RAN by using the identifier information comprises:
selecting, by the RAN node, the aggregation node as an aggregation node that the UE accesses via the second RAN by using the identifier information of the aggregation node, to enable the aggregation node to manage and associate context information of the UE by using the temporary identifier, and deliver a message transmitted by the UE in the second RAN through an interface between the aggregation node and the core network node established by the UE in the first RAN.

10. The network access method according to claim 8, wherein the temporary identifier is a first temporary identifier, the connection establishment request comprises the first temporary identifier and a second temporary identifier, and the second temporary identifier is allocated by the aggregation node for the UE and comprises the identifier information of the aggregation node; and
the selecting, by the RAN node, the network node as the network node that the UE accesses via the second RAN by using the identifier information comprises: selecting, by the RAN node, the network node as the network node that the UE accesses via the second RAN by using the second temporary identifier, to enable the aggregation node to manage and associate context information of the UE by using the second temporary identifier.

11. A network access method, comprising:
allocating, by a core network node, a temporary identifier for a UE when the UE accesses a first RAN, to enable the first to find the core network node that has allocated the temporary identifier, the temporary identifier consisting of identifier information of the core network node and identifier information of the UE; and
transmitting, by the core network node, the temporary identifier to the UE, to enable that the UE stores the temporary identifier, wherein the UE transmits a connection establishment request comprising the temporary identifier to a second RAN while the UE maintains a connection to the first RAN, and the second RAN selects the core network node as a core network node that the UE accesses via the second RAN.

12. The network access method according to claim 11, wherein the transmitting, by the core network node, the temporary identifier to the UE comprises:
transmitting, by the core network node, the temporary identifier to an aggregation node, to enable the aggregation node to transmit the temporary identifier and identifier information of the aggregation node to the UE, wherein the UE in the first RAN establishes a connection to the core network node through the aggregation node.

13. The network access method according to claim 12, further comprising:
receiving, by the core network node, a message delivered by the aggregation node through an interface between the aggregation node and the core network node established by the UE in the first RAN, wherein the message is transmitted by the UE in the second RAN.

14. The network access method according to claim 12, wherein
the temporary identifier is a first temporary identifier; and
the identifier information of the aggregation node is a second temporary identifier allocated by the aggregation node for the UE, and the second temporary identifier comprises the identifier information of the aggregation node.

* * * * *